United States Patent
Giles et al.

(10) Patent No.: US 12,112,935 B2
(45) Date of Patent: Oct. 8, 2024

(54) ION GUIDE

(71) Applicant: Micromass UK Limited, Wilmslow (GB)

(72) Inventors: Kevin Giles, Stockport (GB); Jakub Ujma, Manchester (GB); James Harrison, Stockport (GB); Bharat Chande, Dunkinfield (GB); Graham Scambler, Wilmslow (GB)

(73) Assignee: Micromass UK Limited, Wilmslow (GB)

( * ) Notice: Subject to any disclaimer, the term of this patent is extended or adjusted under 35 U.S.C. 154(b) by 493 days.

(21) Appl. No.: 17/613,796

(22) PCT Filed: May 29, 2020

(86) PCT No.: PCT/GB2020/051304
§ 371 (c)(1),
(2) Date: Nov. 23, 2021

(87) PCT Pub. No.: WO2020/240197
PCT Pub. Date: Dec. 3, 2020

(65) Prior Publication Data
US 2022/0216045 A1 Jul. 7, 2022

(30) Foreign Application Priority Data
May 31, 2019 (GB) .................................... 1907787

(51) Int. Cl.
*H01J 49/06* (2006.01)
*G01N 27/622* (2021.01)
*H01J 49/02* (2006.01)

(52) U.S. Cl.
CPC .......... *H01J 49/065* (2013.01); *G01N 27/622* (2013.01); *H01J 49/022* (2013.01); *H01J 49/025* (2013.01)

(58) Field of Classification Search
CPC ..... G01N 27/622; G01N 27/623; H01J 49/02; H01J 49/022; H01J 49/025; H01J 49/0031;
(Continued)

(56) References Cited

U.S. PATENT DOCUMENTS

| 9,984,861 B2 | 5/2018 | Giles et al. |
| 2005/0134837 A1 | 6/2005 | Sarkozi et al. |

(Continued)

FOREIGN PATENT DOCUMENTS

| GB | 2531386 A | 4/2016 |
| JP | S6226757 A | 2/1987 |

(Continued)

OTHER PUBLICATIONS

Search Report under Section 17(5) for Application No. GB1907787.4, dated Dec. 2, 2019, 3 pages.
(Continued)

*Primary Examiner* — David E Smith
*Assistant Examiner* — Hsien C Tsai
(74) *Attorney, Agent, or Firm* — Goodwin Procter LLP

(57) ABSTRACT

An ion guide or ion trap that comprises a plurality of electrodes (102) is disclosed. The ion guide or ion trap includes a detector (205) that can detect light or particles (114) emitted from the ion guide or ion trap due to electrical breakdown, and a control circuit (111) that can control the ion guide or ion trap in response to the detector (205) detecting light or particles (114) emitted from the ion guide or ion trap.

20 Claims, 13 Drawing Sheets

(58) Field of Classification Search
CPC ...... H01J 49/061; H01J 49/062; H01J 49/065; H01J 49/42; H01J 49/408; H01J 49/422
See application file for complete search history.

(56) References Cited

U.S. PATENT DOCUMENTS

| | | |
|---|---|---|
| 2017/0076926 A1 | 3/2017 | Green |
| 2017/0125229 A1* | 5/2017 | Giles .................... G01N 27/622 |
| 2019/0393023 A1* | 12/2019 | Kozlov .................. H01J 49/40 |

FOREIGN PATENT DOCUMENTS

| | | |
|---|---|---|
| WO | 2005077523 A1 | 8/2005 |
| WO | 2014141116 A2 | 9/2014 |
| WO | 2019171085 A1 | 9/2019 |
| WO | 2019220295 A1 | 11/2019 |
| WO | 2019229465 A1 | 12/2019 |

OTHER PUBLICATIONS

Search Report under Section 17 for Application No. GB2008080.0, dated Nov. 24, 2020, 5 pages.

International Search Report and Written Opinion for International Application No. PCT/GB2020/051304, mailed Aug. 3, 2020, 11 pages.

Brownnutt, M., et al., "Monolithic microfabricated ion trap chip design for scaleable quantum processors", New Journal of Physics 8(10): 1367-2630 (2006).

* cited by examiner

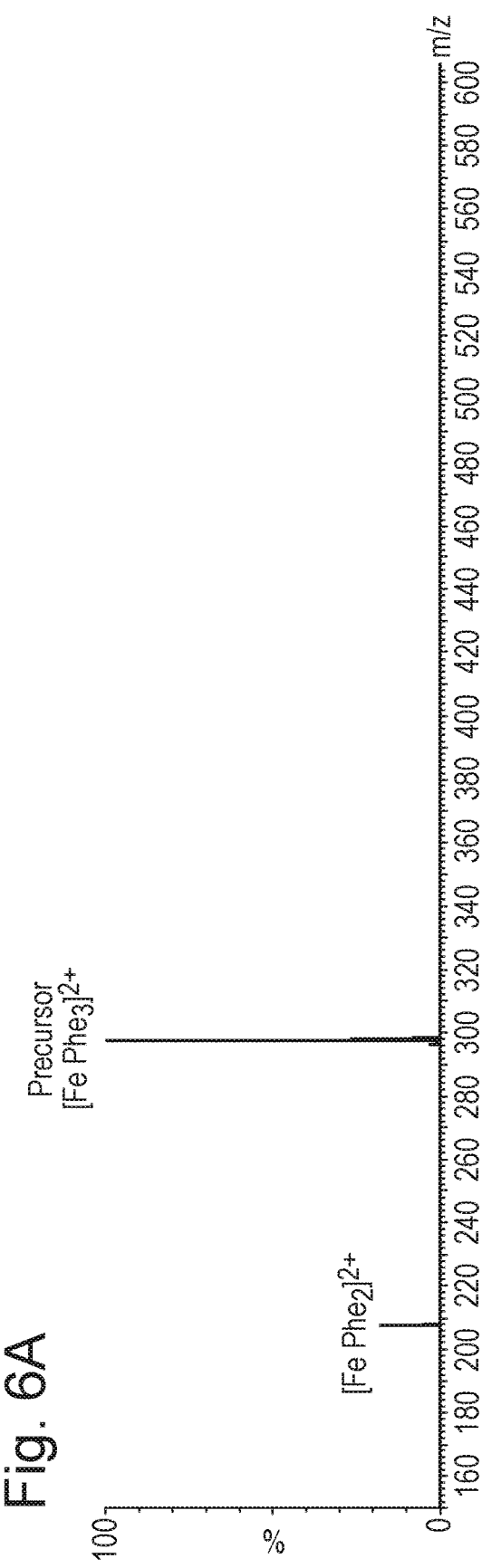
Fig. 6A
Fig. 6B

ION GUIDE

CROSS-REFERENCE TO RELATED APPLICATIONS

This application is a U.S. national phase filing claiming the benefit of and priority to International Patent Application No. PCT/GB2020/051304, filed May 29, 2020, which claims priority from and the benefit of United Kingdom patent application No. 1907787.4 filed on May 31, 2019. The entire contents of these applications are incorporated herein by reference.

FIELD OF THE INVENTION

The present invention relates to an ion guide and/or ion trap, and in particular to an ion guide and/or ion trap for use in an analytical instrument, such as a mass and/or ion mobility spectrometer.

BACKGROUND

Ion guides and ion traps are commonly used to guide and trap ions in analytical instruments. For example, ion guides are used in ion mobility separators to confine ions as they pass through a buffer gas such that the ions separate according to their ion mobility.

The Applicants have recently designed a closed-loop ion mobility separation (IMS) device, for example as is described in U.S. Pat. No. 9,984,861, entitled "Ion Entry/Exit Device", in the name of Micromass UK Limited.

The design of such closed-loop ion mobility separation (IMS) devices has presented a number of problems. These problems are associated with such devices being constructed using relatively large ion guides, but moreover with such devices being operated with particularly long ion residence times (which in turn is due to the relatively large ion guide size, and also due to ions making multiple cycles around the ion guide).

Ion guides typically comprise a plurality of electrodes arranged to form an ion guiding path, with AC or RF and/or DC voltages being applied to the electrodes so as to cause ions to be confined along the ion guiding path. Similarly, ion traps typically comprise a plurality of electrodes, with AC or RF and/or DC voltages being applied to the electrodes so as to cause ions to be confined within the trap.

Typically, the electrodes are mechanically supported by an insulating substrate of a printed circuit board (PCB). A conductive layer bonded to the insulating substrate may be used to provide electrical connections between the electrodes.

The inventors believe that there remains scope for improvements to ion guides and ion traps, and in particular to ion guides and ion traps for use in analytical instruments, such as mass and/or ion mobility spectrometers.

SUMMARY

According to a first aspect, there is provided an ion guide and/or an ion trap comprising a plurality of electrodes attached to an insulating substrate, the insulating substrate comprising polytetrafluoroethylene ("PTFE").

Various embodiments are directed to the use of a PTFE-based insulating substrate to form an ion guide or trap for an analytical instrument, such as a mass and/or ion mobility spectrometer. According to various embodiments, the electrodes of the ion guide or trap are attached to a PTFE-based insulating substrate, for example such that the insulating substrate mechanically supports the electrodes. Particular examples of such a PTFE-based material include the CuClad® series of insulating substrates.

Conventional ion guides and traps are commonly formed by attaching electrodes to a printed circuit board (PCB) comprising an insulating substrate formed of FR-4, which is made of woven fiberglass with an epoxy resin binder. Various inorganic fillers may also be present. FR-4 is commonly used due to its high mechanical strength, low cost, and ease of use.

PTFE-based materials, such as CuClad®, have been developed for military and high frequency (such as microwave) applications, due, for example, to their low dielectric losses. However, such materials may have relatively low mechanical strength.

The inventors have now realised, however, that despite such properties, it can be advantageous to use a PTFE-based material as a PCB insulating substrate in analytical instrument ion guides and/or ion traps. In particular, the inventors have found that using a PTFE-based insulating substrate to form an ion guide and/or ion trap allows for the construction of relatively large ion guides or traps and/or for operation of ion guides or traps with relatively long ion residence times, without introducing contamination to ions being guided by the ion guide and/or to ions trapped by the ion trap, for example in the form of adduct formation.

In particular, the inventors have found that PTFE-based materials are particularly advantageous for use in closed-loop ion mobility separation (IMS) devices, such as those described in U.S. 9,984,861, entitled "Ion Entry/Exit Device", in the name of Micromass UK Limited, the entire contents of which is incorporated herein by reference.

As will be described further below, the inventors have found that such closed-loop ion mobility separation (IMS) devices can suffer from the problem of insulating substrate contamination. This is due to such devices using relatively large closed-loop ion guides, such that relatively large volumes of insulating substrate material are present within a single vacuum chamber, but moreover to such devices being operated with particularly long ion residence times (which in turn is due to the relatively large ion guide size, and also due to ions making multiple cycles around the ion guide).

Indeed, the problem of insulating substrate contamination has not previously arisen, as ion guides with residence times as long as and with sizes as large as those used in such closed-loop ion mobility separation (IMS) devices have not previously been constructed.

The use of a PTFE-based insulating substrate in these devices has been found to avoid contamination in such closed-loop ion mobility separation (IMS) devices. The use of a PTFE-based insulating substrate may also be more generally advantageous to form an ion guide and/or trap for an analytical instrument.

It will be appreciated, therefore, that the various embodiments provide an improved ion guide and/or ion trap, and in particular an improved ion guide and/or ion trap for use in analytical instruments, such as mass and/or ion mobility spectrometers.

The insulating substrate may comprise woven fiberglass. Thus, the insulating substrate may be a woven fiberglass/PTFE composite material.

The insulating substrate may comprise cross-plied woven fiberglass. That is, alternate layers of fiberglass plies may be oriented approximately at 90° to each other. Examples of a cross-plied woven fiberglass/PTFE-based material include the CuClad® series of insulating substrates. The inventors have found that cross-plied materials may be particularly effective regarding avoiding contamination.

The insulating substrate may comprise a ratio of fiberglass to PTFE (by weight and/or by volume) selected from the group consisting of: (i) ≥0.1; (ii) ≥0.2; (iii) ≥0.3; (iv) ≥0.4; (v) ≥0.5; (vi) ≥0.6; (vii) ≥0.7; (viii) ≥0.8; (ix) ≥0.9; (x) ≥1; (xi) ≥1.1; (xii) ≥1.3; and (xiii) ≥1.5. The inventors have found that materials having higher ratios of fiberglass to PTFE may be more effective regarding avoiding contamination than materials having lower ratios of fiberglass to PTFE.

The insulating substrate may have a dialectic constant selected from the group consisting of: (i) <2; (ii) ≥2; (iii) ≥2.1; (iv) ≥2.2; (v) ≥2.3; (vi) ≥2.4; (vii) ≥2.5; and (viii) ≥2.6. The insulating substrate may have a dialectic constant of between 2.4 and 2.6, such as approximately 2.5. A particular example of such a material is CuClad® 250. The dielectric constant may be measured at 10 GHz or 1 MHz using the IPC TM-650 2.5.5.3 (C23/50) test method.

The insulating substrate may be CuClad®. The inventors have found that CuClad® materials are particularly effective regarding avoiding contamination.

The insulating substrate may be CuClad®250. The inventors have found that CuClad® 250 is particularly effective regarding avoiding contamination. Beneficially, CuClad® 250 is also the most rigid of the CuClad® series of materials.

The ion guide and/or ion trap may be formed by subjecting the insulating substrate to cleaning. The insulating substrate may be cleaned using alcohol, such as high purity methanol (LCMS grade). The inventors have found that cleaning can reduce contaminants.

The ion guide and/or ion trap may be formed by subjecting the insulating substrate to vacuum baking. The inventors have found that vacuum baking can reduce contaminants.

The ion guide and/or ion trap may be formed by subjecting the insulating substrate to the cleaning and then to the vacuum baking.

The insulating substrate may be vacuum baked for (i) at least 10 hours; (ii) at least 20 hours; (iii) at least 30 hours; (iv) at least 40 hours; (v) at least 50 hours; (vi) at least 100 hours; (vii) at least 150 hours; (viii) at least 200 hours; (ix) at least 250 hours; (x) at least 300 hours; or (xi) at least 350 hours at a temperature of at least 100° C.

The insulating substrate may comprise no solder resist. The insulating substrate may have no solder resist applied to it, or solder resist applied to the insulating substrate may be removed. The inventors have found that removing solder resist can reduce contaminants, since for example solder resist may reduce the effectiveness of vacuum baking.

The insulating substrate may comprise only a single (contiguous) layer of insulating substrate material. The inventors have found that processes for manufacturing multi-layered boards, which may include a "desmear" and/or "pattern plate" process, can increase the likelihood of contaminants. For example, a "desmear" process can increase the likelihood of contaminants, such as Diethylene Glycol Butyl Ether (DGBE). Moreover, contaminants may be trapped between the layers of multi-layered boards. Therefore, the inventors have found that constructing an ion guide and/or ion trap from a single (contiguous) layer of insulating substrate material can be effective in avoiding contaminants. Thus, the ion guide and/or ion trap may be formed without subjecting the insulating substrate to a "desmear" and/or "pattern plate" process.

The ion guide and/or ion trap may comprise a detector configured to detect light or particles emitted from (the electrodes of) the ion guide and/or ion trap, for example due to electrical breakdown (between the electrodes).

The ion guide and/or ion trap may comprise a control circuit configured to control the ion guide and/or ion trap in response to the detector detecting light or particles emitted from the ion guide and/or ion trap.

According to another aspect, there is provided an ion guide and/or ion trap comprising:
a plurality of electrodes;
a detector configured to detect light or particles emitted from the ion guide and/or ion trap due to electrical breakdown; and
a control circuit configured to control the ion guide and/or ion trap in response to the detector detecting light or particles emitted from the ion guide and/or ion trap.

These aspects can, and in various embodiments do, include one or more, or all, of the optional features described herein.

Various further embodiments are directed to techniques for controlling an ion guide and/or ion trap in response to a detector detecting light or particles emitted from the ion guide and/or ion trap as a result of electrical breakdown (gas discharge) between the electrodes of the ion guide and/or ion trap. Thus, for example and in various embodiments, in response to light or charged particles emitted as a result of an electrical breakdown (gas discharge) between the electrodes of the ion guide and/or ion trap, a voltage applied to the electrodes may be changed, such as reduced, removed or turned off, to thereby reduce the risk of, or prevent, further electrical breakdown.

As will be discussed further below, the inventors have found that large ion guides, such as those used in cyclic ion mobility separation (IMS) devices, may be particularly susceptible to electrical breakdown. The likelihood of breakdown may be increased, for example, due (amongst other things) to such devices being constructed using relatively large ion guides, to such devices being operated with particularly long ion residence times (which will mean that a relatively large RF voltage may be applied to the electrodes of the ion guide for a relatively long time), and/or to the pressure at which the device is operated.

The control circuit may be configured to control the ion guide and/or ion trap by controlling one or more operational parameters of the ion guide and/or ion trap.

The one or more operational parameters may comprise (the magnitude of) one or more voltages applied to the electrodes of the ion guide and/or ion trap.

The ion guide and/or ion trap may comprise a voltage source configured to apply one or more voltages to the plurality of electrodes.

The control circuit may be configured to control the ion guide and/or ion trap by controlling (the magnitude of) one or more of the voltage(s) applied to the plurality of electrodes.

The control circuit may be configured to control the one or more voltages applied to the plurality of electrodes by reducing, removing or turning off one or more of the voltage(s) applied to the plurality of electrodes.

The control circuit may be configured to reduce, remove or turn off one or more of the voltage(s) applied to the plurality of electrodes until light or particles emitted from the ion guide and/or ion trap are no longer detected by the detector. The control circuit may be configured to subsequently increase, apply or turn on one or more of the voltage(s) applied to the plurality of electrodes.

The one or more voltages may comprise one or more DC and/or AC and/or RF voltages.

The control circuit may be configured to control the one or more voltages applied to the plurality of electrodes by reducing, removing or turning off an RF voltage applied to the plurality of electrodes.

Additionally or alternatively, the one or more operational parameters may comprise a gas pressure (that the (plurality of electrodes of the) ion guide and/or ion trap is operated in) and/or a gas composition (that the (plurality of electrodes of the) ion guide and/or ion trap is operated in).

The ion guide and/or ion trap may comprise a device configured to control a gas pressure and/or gas composition (that the (plurality of electrodes of the) ion guide and/or ion trap is operated in).

The control circuit may be configured to control the ion guide and/or ion trap by controlling the gas pressure and/or gas composition (that the (plurality of electrodes of the) ion guide and/or ion trap is operated in).

The control circuit may be configured to adjust (increase or decrease) the gas pressure and/or gas composition until light or particles emitted from the ion guide and/or ion trap are no longer detected by the detector. The control circuit may be configured to subsequently return the gas pressure and/or gas composition to its initial setting.

The detector may comprise a light-sensitive detector configured to detect light emitted from the (electrodes of the) ion guide and/or ion trap.

The detector may comprise a photodiode configured to detect light emitted from the (electrodes of the) ion guide and/or ion trap. The inventors have found that photodiodes are particularly convenient to be integrated in an ion guide and/or ion trap.

The detector may comprise a photomultiplier configured to detect light emitted from the (electrodes of the) ion guide and/or ion trap.

The detector may comprise a charge-sensitive detector configured to detect charged particles emitted from the (electrodes of the) ion guide and/or ion trap.

The detector may comprise a Faraday cup and/or electron multiplier.

According to an aspect, there is provided an ion guide and/or trap comprising:
 a plurality of electrodes;
 one or more voltage sources configured to apply one or more voltages to the plurality of electrodes;
 a detector configured to detect light in the vicinity of the electrodes; and
 a control circuit configured to reduce, remove or turn off one or more of the one or more voltages in response to the detector detecting light in the vicinity of the electrodes.

These aspects can, and in various embodiments do, include one or more, or all, of the optional features described herein.

In these aspects and embodiments, one or more of the voltages applied to the electrodes of the ion guide and/or ion trap may be reduced, removed or turned off when the detector, which may be arranged in the vicinity of (such as within the same vacuum chamber as) the electrodes, detects light. In these aspects and embodiments, in addition to the voltage(s) being reduced, removed or turned off when the detector detects light emitted from the (electrodes of the) ion trap and/or ion guide (for example due to electrical breakdown), the voltage(s) may also be reduced, removed or turned off when the detector detects light from elsewhere. For example, when light is introduced into the housing in which the electrodes are arranged, for example due to a user or service engineer opening the housing, the voltage(s) may be reduced, removed or turned off. This will ensure that the user or service engineer is not exposed to potentially hazardous voltages.

Thus, in these aspects and embodiments, the detector (photodiode) may be configured to protect the instrument from damage due to electrical breakdown, but also to protect a user or service engineer from potentially hazardous voltage(s). As such, the protection mechanism may be extended to the removal of potentially hazardous voltage(s) in the event that a user or service engineer lets light into what is otherwise a sealed, dark, enclosure, for example during maintenance.

Thus, in various embodiments, the plurality of electrodes are arranged in a housing such as a vacuum chamber housing, the detector is configured to detect light in the housing, and the control circuit is configured to reduce, remove or turn off one or more of the one or more voltages in response to the detector detecting light in the housing.

The (plurality of electrodes of the) ion guide and/or ion trap may be arranged in a housing such as a vacuum housing or chamber.

The detector may be arranged within the housing.

The housing may comprise a transparent or translucent window, and the detector may be arranged outside of the housing, in optical communication with the inside of the housing via the transparent or translucent window.

An inner surface of the housing may be reflective, for example such that light emitted from the ion guide and/or ion trap is reflected by the reflective inner surface. The inventors have found that by arranging electrodes within a reflective housing, light emitted from the ion guide and/or ion trap may be more readily detected.

The one or more (RF or AC) voltages may be configured to cause ions to be confined within the ion guide and/or ion trap.

The plurality of electrodes may be arranged to form an ion guiding path.

The one or more (DC) voltages may be configured to urge ions within the ion guide in the direction of the ion guiding path.

The ion guiding path may have a length selected from the group consisting of: (i) ≥5 cm; (ii) ≥10 cm; (iii) ≥20 cm; (iv) ≥30 cm; (v) ≥40 cm; and (v) ≥50 cm.

The ion guide and/or ion trap may be configured such that ions have a residence time within the ion guide and/or ion trap selected from the group consisting of: (i) ≥50 ms; (ii) ≥100 ms; (iii) ≥200 ms; (iv) ≥300 ms; and (v) ≥400 ms.

The ion guide may be configured such that ions perform one or more cycles along or around the ion guiding path.

The ion guiding path may be a closed-loop ion guiding path. The closed-loop ion guiding path may comprise a circular, oval or elliptical ion guiding path, for example such that ions can make multiple cycles or loops around the ion guiding path.

Alternatively, the ion guiding path may be a substantially linear or open-ended ion guiding path, for example such that the two ends of the ion guiding path are in different positions. In this case, the ion guide may be configured to reflect ions between two ends of the linear or open-ended ion guiding path such that the ions can perform a plurality of cycles along the ion guiding path.

The ion guide and/or ion trap may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

A buffer gas may be supplied to the ion guide. Ions may be urged along the ion guiding path such that the ions separate according a physicochemical property (as the ions pass through the buffer gas). The physicochemical property may be ion mobility.

According to an aspect, there is provided an ion mobility separator comprising the ion guide and/or ion trap described above.

According to an aspect, there is provided an analytical instrument comprising the ion guide and/or ion trap above or the ion mobility separator described above.

The analytical instrument may be an ion mobility spectrometer and/or a mass spectrometer.

According to an aspect, there is provided a method of manufacturing an ion guide and/or ion trap comprising a plurality of electrodes, the method comprising providing an insulating substrate comprising polytetrafluoroethylene ("PTFE"), and attaching the plurality of electrodes to the insulating substrate.

The insulating substrate may comprise woven fiberglass.

The insulating substrate may comprise cross-plied woven fiberglass.

The insulating substrate may comprise a ratio of fiberglass to PTFE (by weight and/or by volume) selected from the group consisting of: (i) ≥0.1; (ii) ≥0.2; (iii) ≥0.3; (iv) ≥0.4; (v) ≥0.5; (vi) ≥0.6; (vii) ≥0.7; (viii) ≥0.8; (ix) ≥0.9; (x) 1; (xi) 1.1; (xii) 1.3; and (xiii) 1.5.

The insulating substrate may have a dialectic constant selected from the group consisting of: (i) <2; (ii) ≥2; (iii) ≥2.1; (iv) ≥2.2; (v) ≥2.3; (vi) ≥2.4; (vii) ≥2.5; and (viii) ≥2.6. The insulating substrate may have a dialectic constant of 2.40 to 2.60, such as around 2.5.

The insulating substrate may be CuClad®. The insulating substrate may be CuClad® 250.

The method may comprise vacuum baking the insulating substrate.

According to an aspect, there is provided a method of manufacturing the ion guide and/or ion trap described above, the method comprising vacuum baking the insulating substrate of the ion guide and/or ion trap.

The method may comprise cleaning the insulating substrate. The insulating substrate may be cleaned using alcohol, such as high purity methanol (LCMS grade).

The method may comprise cleaning and then vacuum baking the insulating substrate.

The method may comprise vacuum baking the insulating substrate for (i) at least 10 hours; (ii) at least 20 hours; (iii) at least 30 hours; (iv) at least 40 hours; (v) at least 50 hours; (vi) at least 100 hours; (vii) at least 150 hours; (viii) at least 200 hours; (ix) at least 250 hours; (x) at least 300 hours; or (xi) at least 350 hours; at a temperature of at least 100° C.

The method may comprise forming the ion guide and/or ion trap without applying solder resist to the insulating substrate, or removing solder resist applied to the insulating substrate.

The insulating substrate may comprise only a single (contiguous) layer of insulating substrate material. The method may comprise forming the ion guide and/or ion trap without subjecting the insulating substrate to a "desmear" process and/or to a "pattern plate" process.

The method may comprise providing a detector configured to detect light or particles emitted from the (electrodes of the) ion guide and/or ion trap due to electrical breakdown.

The method may comprise providing a control circuit configured to control the ion guide and/or ion trap in response to the detector detecting light or particles emitted from the (electrodes of the) ion guide and/or ion trap due to electrical breakdown.

According to an aspect, there is provided a method of operating an ion guide and/or ion trap comprising a plurality of electrodes, the method comprising:
  detecting light or particles emitted from the electrodes of the ion guide and/or ion trap due to electrical breakdown; and
  controlling the ion guide and/or ion trap in response to detecting light or particles emitted from the electrodes of the ion guide and/or ion trap.

These aspects can, and in various embodiments do, include one or more, or all, of the optional features described herein.

The method may comprise controlling the ion guide and/or ion trap by controlling one or more operational parameters of the ion guide and/or ion trap.

The one or more operational parameters may comprise (the magnitude of) one or more voltages applied to the electrodes of the ion guide and/or ion trap.

The method may comprise applying one or more voltages to the plurality of electrodes. The one or more voltages may comprise one or more DC and/or AC and/or RF voltages.

The method may comprise controlling the ion guide and/or ion trap by controlling the (magnitude of) one or more voltages applied to the plurality of electrodes.

The method may comprise controlling the one or more voltages applied to the plurality of electrodes by reducing, removing or turning off one or more of the voltage(s) applied to the plurality of electrodes.

The method may comprise controlling the one or more voltages applied to the plurality of electrodes by reducing, removing or turning off an RF or AC voltage applied to the plurality of electrodes.

The method may comprise reducing the magnitude of one or more of the voltage(s) applied to the plurality of electrodes until light or particles emitted from the ion guide and/or ion trap are no longer detected by the detector. The method may comprise subsequently increasing the magnitude of one or more of the voltage(s) applied to the plurality of electrodes.

Additionally or alternatively, the one or more operational parameters may comprise a gas pressure (that the electrodes are operated in) and/or a gas composition (that the plurality of electrodes are operated in).

The method may comprise controlling a gas pressure and/or gas composition (that the plurality of electrodes are operated in).

The method may comprise controlling the ion guide and/or ion trap by controlling the gas pressure and/or gas composition (that the plurality of electrodes are operated in).

The method may comprise adjusting (increasing or decreasing) the gas pressure and/or gas composition until light or particles emitted from the electrodes of the ion guide and/or ion trap are no longer detected by the detector. The method may comprise subsequently returning the gas pressure and/or gas composition to its earlier value.

The method may comprise detecting light emitted from the ion guide and/or ion trap using a light-sensitive detector.

The method may comprise detecting light emitted from the ion guide and/or ion trap using a photodiode.

The method may comprise detecting light emitted from the ion guide and/or ion trap using a photomultiplier.

The method may comprise detecting charged particles emitted from the ion guide and/or ion trap using a charge-sensitive detector.

The method may comprise detecting charged particles emitted from the ion guide and/or ion trap using a Faraday cup and/or electron multiplier.

According to an aspect, there is provided a method of operating an ion guide and/or trap comprising:

applying one or more voltage to a plurality of electrodes of the ion guide and/or trap;

detecting light in the vicinity of the electrodes; and reducing, removing or turning off one or more of the one or more voltages in response to detecting light in the vicinity of the electrodes.

These aspects can, and in various embodiments do, include one or more, or all, of the optional features described herein.

The plurality of electrodes may be arranged in a housing such as a vacuum chamber housing.

The method may comprise detecting light in the housing, and reducing, removing or turning off one or more of the one or more voltages in response to detecting light in the housing.

The method may comprise applying the one or more (RF or AC) voltages such that ions are confined within the ion guide and/or ion trap.

The plurality of electrodes may be arranged to form an ion guiding path. The method may comprise applying the one or more (DC) voltages such that ions are urged within the ion guide in the direction of the ion guiding path.

The length of the ion guiding path may be selected from the group consisting of: (i) ≥5 cm; (ii) ≥10 cm; (iii) ≥20 cm; (iv) ≥30 cm; (v) ≥40 cm; and (vi) ≥50 cm.

The ion guide and/or ion trap may be configured such that ions have a residence time within the ion guide and/or ion trap selected from the group consisting of: (i) ≥50 ms; (ii) ≥100 ms; (iii) ≥200 ms; (iv) ≥300 ms; and (v) ≥400 ms.

The method may comprise causing ions to perform one or more cycles along or around the ion guiding path.

The ion guiding path may be a closed-loop ion guiding path. The closed-loop ion guiding path may comprise a circular, oval or elliptical ion guiding path, for example such that ions can make multiple cycles or loops around the ion guiding path.

Alternatively, the ion guiding path may be a substantially linear or open-ended ion guiding path, for example such that the two ends of the ion guiding path are in different positions. In this case, the method may comprise reflecting ions between two ends of the linear or open-ended ion guiding path such that the ions can perform a plurality of cycles along the ion guiding path.

The method may comprise maintaining the ion guide and/or ion trap at a pressure elected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

The method may comprise supplying a buffer gas to the ion guide and/or ion trap. The method may comprise urging ions along the ion guiding path such that the ions separate according a physicochemical property (as the ions pass through the buffer gas).

The physicochemical property may be ion mobility.

According to an aspect, there is provided a method of operating an ion mobility separator comprising an ion guide and/or ion trap, the method comprising operating the ion guide and/or ion trap according to the method described above.

According to an aspect, there is provided a method of operating an analytical instrument comprising an ion guide and/or ion trap or an ion mobility separator, the method comprising operating the ion guide and/or ion trap or ion mobility separator according to the method described above.

The analytical instrument may be an ion mobility and/or mass spectrometer.

BRIEF DESCRIPTION OF THE DRAWINGS

Various embodiments of the present invention will now be described, by way of example only, and with reference to the accompanying drawings in which:

FIG. 6 shows mass spectra illustrating contamination of a cyclic ion mobility separator constructed using FR-4;

DETAILED DESCRIPTION

Figure 1:
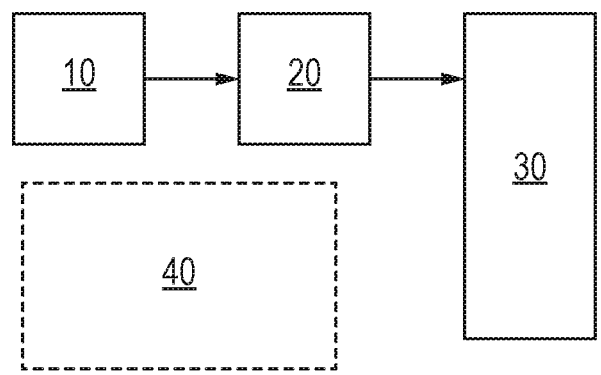
FIG. 1 shows schematically an analytical instrument in accordance with various embodiments.

FIG. 1 shows schematically an analytical instrument such as a mass and/or ion mobility spectrometer in accordance with various embodiments. As shown in FIG. 1, the analytical instrument comprises an ion source 10, one or more functional components 20 that are arranged downstream from the ion source 10, and an analyser 30 that is arranged downstream from the ion source 10 and from the one or more functional components 20.

It should be noted that FIG. 1 is merely schematic, and that the analytical instrument may (and in various embodiments does) include other components, devices and functional elements to those shown in FIG. 1.

The ion source 10 may be configured to generate ions, for example by ionising an analyte. The ion source 10 may comprise any suitable ion source. The analytical instrument may optionally comprise a chromatography or other separation device (not shown in FIG. 1) upstream of (and coupled to) the ion source 10.

The analyser 30 may be configured to analyse ions, so as to determine (measure) one or more of their physico chemical properties, such as their mass to charge ratio, time of flight, (ion mobility) drift time and/or collision cross section (CCS). The analyser 30 may comprise a mass analyser (that is configured to determine the mass to charge ratio or time of flight of ions) and/or an ion mobility analyser (that is configured to determine the ion mobility drift time or collision cross section (CCS) of ions).

As shown in FIG. 1, the analytical instrument may comprise a control system 40, that may be configured to control the operation of the analytical instrument, for example in the manner of the various embodiments described herein. The control system may comprise suitable control circuitry that is configured to cause the instrument to operate in the manner of the various embodiments described herein. The control system may comprise suitable processing circuitry configured to perform any one or more or all of the necessary processing and/or post-processing operations in respect of the various embodiments described herein. In various embodiments, the control system may comprise a suitable computing device, a microprocessor system, a programmable FPGA (field programmable gate array), and the like.

As illustrated by FIG. 1 the analytical instrument may be configured such that ions can be provided by (sent from) the ion source 10 to the analyser 30 via the one or more functional components 20. The one or more functional components 20 may comprise any suitable such components, devices and functional elements of an analytical instrument (mass and/or ion mobility spectrometer).

In various particular embodiments, the one or more functional components 20 comprise one or more ion guides and/or one or more ion traps.

One or more of the ion guides and/or ion traps may be configured to simply (passively) guide and/or trap ions. Additionally or alternatively, one or more of the ion guides and/or ion traps may affect ions as they are guided by and/or trapped by the one or more ion guides and/or ion traps.

For example, in various embodiments, one or more ion guides and/or ion traps may be a mass filter, which may be configured to filter ions according to their mass to charge ratio. One or more ion guides and/or ion traps may be an activation, collision, fragmentation or reaction device configured to activate, fragment or react ions. One or more ion guides and/or ion traps may be an ion mobility separator configured to separate ions according to their ion mobility.

According to various particular embodiments, the ion guide may be an ion mobility separator, and ions may be separated according to their ion mobility. The ion mobility separator may comprise a linear ion mobility separator, or a closed loop (cyclic) ion mobility separator.

In these embodiments, ions may be separated according to their ion mobility such that analyte ions having different ion mobilities (collision cross sections) arrive at an exit region of the ion mobility separator at different times, for example such that ions with relatively high ion mobilities arrive at the exit region ahead of ions with relatively low ion mobilities (or such that ions with relatively low values of ion mobility arrive at the exit region ahead of ions with relatively high values of ion mobility).

Where, as described below, the ion mobility separator comprises a cyclic or closed-loop separator, the analyte ions may be separated by causing the analyte ions to make any integer number of cycles of the cyclic or closed-loop separator, such as for example one or more than one cycle of the cyclic or closed-loop separator.

Thus, according to various embodiments, an ion guide and/or ion trap is provided that comprises a plurality of electrodes.

According to various embodiments, the ion guide and/or ion trap comprises a linear, straight ion guide and/or ion trap, for example such that the central axis of the ion guide (the axial direction) comprises a straight line. However, it would also be possible for the ion guide to be curved, kinked, closed-loop, cyclic, circular, or otherwise non-linear. In this case, the central axis of the ion guide (and the axial direction) may comprise a curved line, kinked line, closed-loop, cyclic, circular or other non-straight line.

The ion guide and/or ion trap may be configured such that ions are confined within the ion guide and/or ion trap, for example in a radial direction, where the radial direction is orthogonal to the direction of travel of ions through the ion guide. According to various embodiments, a radio frequency (RF) voltage may be applied to the electrodes in order to confine ions (radially) within the ion guide and/or ion trap (so as to generate a pseudo-potential well that acts to confine ions within the ion guide and/or ion trap), and the ion guide and/or ion trap may comprise an RF voltage source configured to apply the RF voltage to the electrodes. Opposite phases of the RF voltage may be applied to adjacent electrodes, for example.

According to various embodiments, a DC voltage gradient may be applied to the electrodes in order to urge ions though the ion guide and/or ion trap (that is, so as to generate an (axial) electric field that acts to urge ions though the ion guide and/or ion trap), and the ion guide and/or ion trap may comprise a DC voltage source configured to apply the DC voltage gradient to the electrodes. Different DC voltages may be applied to different (axially spaced) electrodes so as to create a DC voltage gradient that urges ions within the ion guide and/or ion trap (in an axial direction).

Additionally or alternatively, a travelling DC voltage may be applied to the electrodes in order to urge ions though the ion guide. That is, a DC voltage may be successively applied to different (axially spaced) electrodes so as to create a travelling DC potential barrier that travels in a direction so as to urge ions within the ion guide to move through the ion guide.

Each of the electrodes may have any suitable shape. In various particular embodiments, one or more or each electrode has an aperture through which ions may travel in use. However, one or more or each electrode may also or instead comprise an open-ended or U-shaped electrode, a rod electrode, a segmented rod electrode, and the like.

The electrodes may each be formed form any suitable metal, such as for example, steel, stainless steel, copper, gold, aluminium, and the like.

According to various embodiments, the ion guide and/or ion trap comprises one or more insulating substrates, and one or more or each of the plural electrodes is attached to an insulating substrate. Each rigid support member may form part of a printed circuit board (PCB).

Each insulating substrate may comprise one or plural holes or slots, where one or more or each hole or slot is configured to receive a protrusion of an electrode. The plural holes or slots may be arranged such that plural electrodes can be attached to the insulating substrate, for example by inserting respective electrode protrusions into each hole or slot. Thus, one or more or each electrode may be attached to an insulating substrate by inserting the electrode's protrusion or protrusions into corresponding holes or slots in the insulating substrate.

According to various embodiments, one or more or each electrode is (fixedly) attached to the insulating substrate after one or more of its protrusions have been inserted into one or more corresponding holes or slots. For example, one or more or each electrode may be soldered to its respective insulating substrate.

Figure 2:
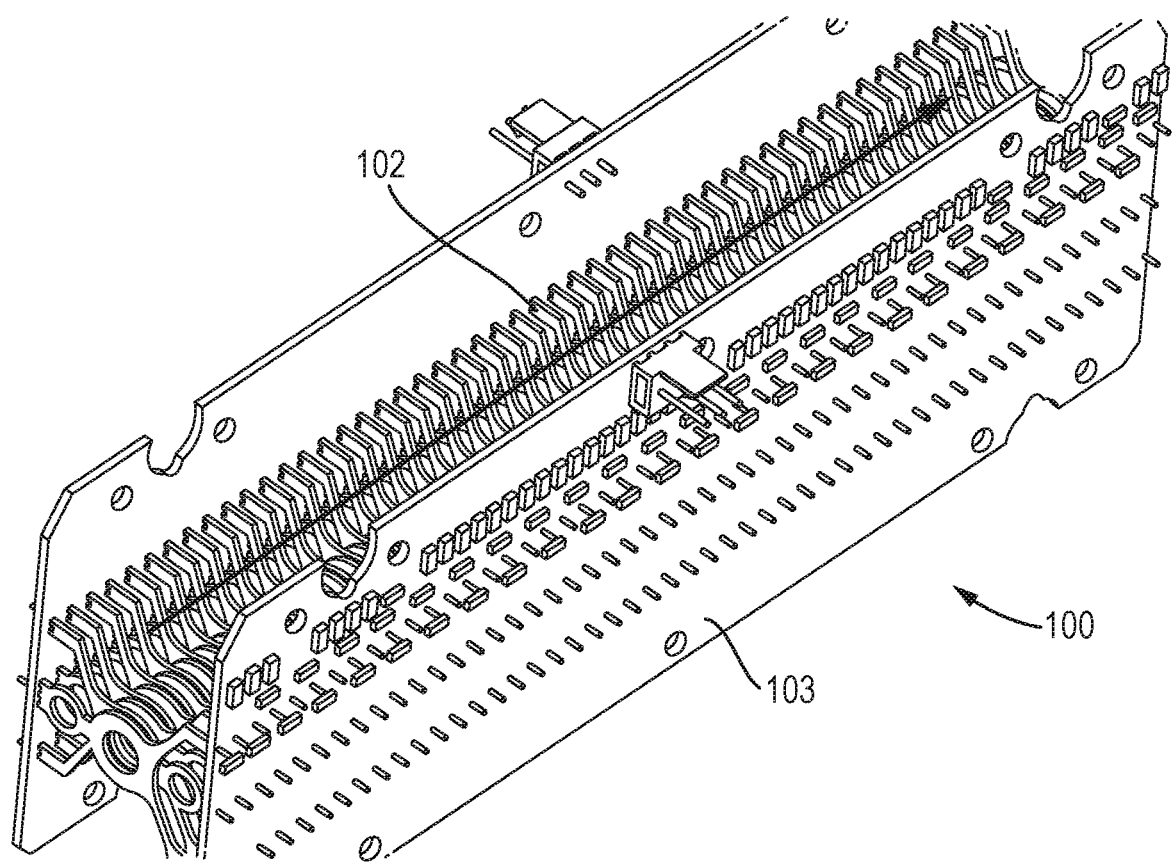
FIG. 2 illustrates a linear ion guide.

FIG. 2 shows a linear ion guide 100 in accordance with various embodiments. As shown in FIG. 2, the ion guide 100 may be configured such that ions are guided by the ion guide 100 as they pass through the ion guide 100. As also shown in FIG. 2, the ion guide 100 comprises a plurality of electrodes 102 attached, for example by soldering, to a printed circuit board (PCB) insulating substrate 103. DC and/or AC/RF voltages can be applied to the electrodes 102 to confine the ions and propel the ions from one end of the ion guide to the other end (as described above).

Figure 3:
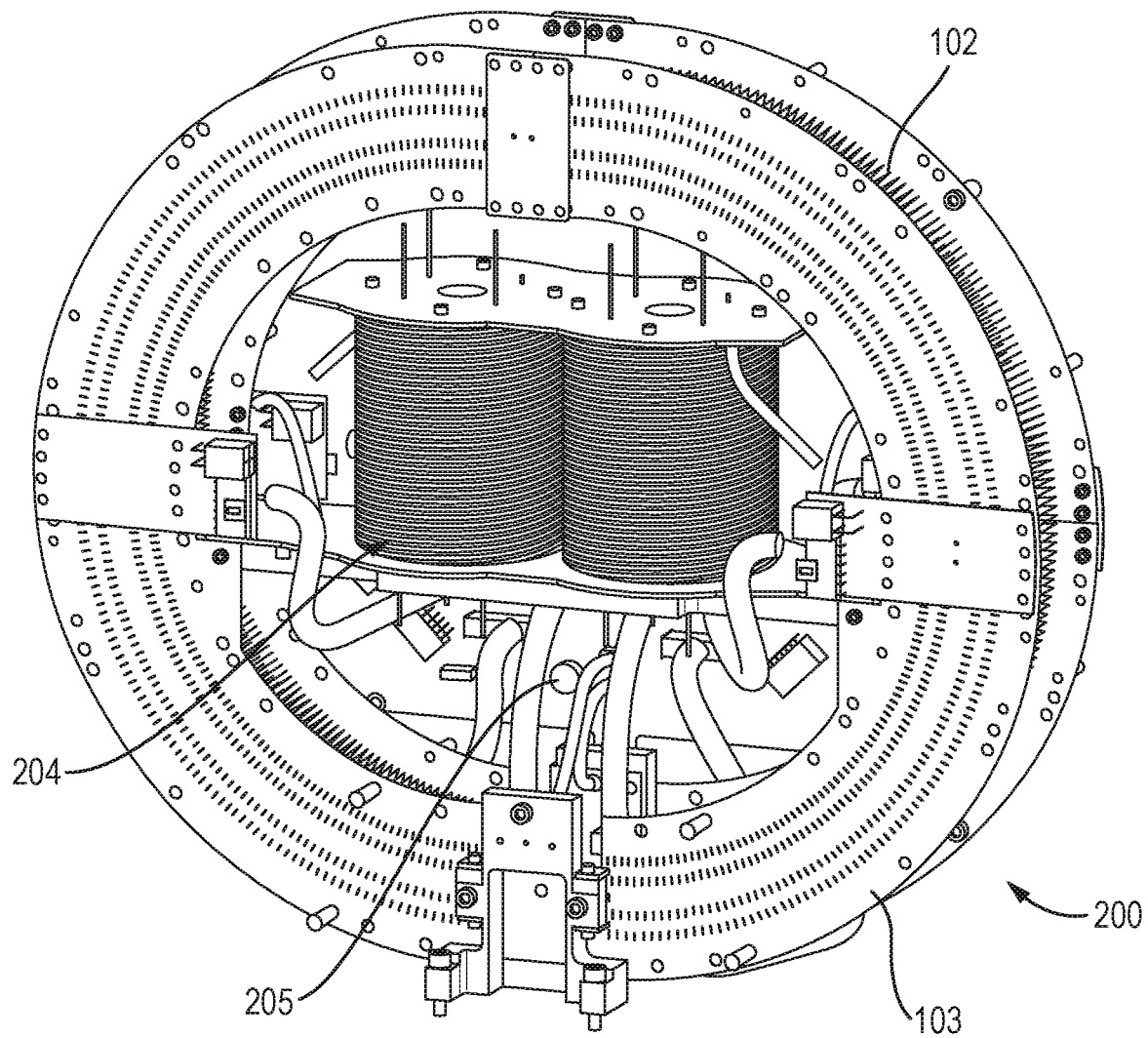
FIG. 3 illustrates a cyclic ion guide.

FIG. 3 shows a cyclic ion guide 200. The cyclic ion guide 200 comprises a plurality of electrodes 102 attached (soldered) to an insulating substrate 103. The electrodes are arranged to form a closed-loop ion guiding path, which in this case is in the form of a racetrack shape. Other shapes are possible. DC and/or AC or RF voltages can be applied to the electrodes 102 so as to confine ions and cause the ions to perform one or more cycles around the ion guide 200 as described above). The ion guide may comprise integrated electrical ballast 204, for example as described in PCT/GB2019/050668, the entire contents of which are hereby incorporated by reference. However, this is not essential.

As described above, conventional ion guides are commonly formed by attaching the electrodes to a printed circuit board (PCB) comprising an insulating substrate formed of FR-4, which is made of woven fiberglass with an epoxy resin binder, coated in solder resist. However, as described in more detail below, when used in a cyclic IMS device, FR-4 has been found to be responsible for contamination to ions, in particular in the form of adduct formation. This is due primarily to the relatively long ion residence time of ions within the cyclic IMS device.

Various embodiments are directed to the use of a PTFE-based insulating substrate to form an ion guide and/or ion trap for an analytical instrument. Particular examples of such a PTFE-based material include the CuClad® series of insulating substrates.

The inventors have now found that by using a PTFE-based insulating substrate to form a relatively large ion guide and/or ion trap and/or an ion guide and/or trap that is to be operated with relatively long ion residence times, contamination to ions being guided by the ion guide and/or trapped by the ion trap, for example in the form of adduct formation, can be avoided.

Thus, by using an ion guide and/or ion trap comprising an insulating substrate comprising PTFE in an analytical instrument, the performance of the analytical instrument can be improved.

Although FR-4 has not been observed to be responsible for contamination to ions in "normal" ion guides or traps which are operated with relatively short ion residence times and which are constructed using relatively small amounts of PCB material, the use of a PTFE-based insulating substrate to form an ion guide and/or ion trap may be generally advantageous. However, it may be particularly advantageous where relatively large ion guides and/or ion traps are used and/or where ions are arranged to have relatively long residence times within the ion guide and/or ion trap, since these factors are associated with the potential for ion contamination such as adduct formation.

In particular, the inventors have found that PTFE-based materials are particularly advantageous for use in closed-loop ion mobility separation (IMS) devices. This is because such closed-loop ion mobility separation (IMS) devices have been found to be susceptible to the problem of insulating substrate contamination. This is firstly due to such devices using relatively large closed-loop ion guides, such that relatively large volumes of insulating substrate material are present within a single vacuum chamber. For example, the surface area of insulating substrate of the cyclic ion guide of FIG. 3 is approximately six times that of the linear ion guide of FIG. 2.

Moreover, these devices have particularly long ion residence times, firstly due to the relatively large ion guide size, and also due to ions making multiple cycles around the ion guide.

FIG. 4 illustrates a particular example of an ion mobility separator (IMS) device which may comprise a cyclic ion guide, such as the one illustrated in FIG. 2, according to various embodiments. The embodiments of the IMS device shown in FIG. 4 are substantially as described in U.S. Pat. No. 9,984,861 (Micromass), previously incorporated herein by reference. It will be appreciated that the embodiments described herein are not limited to use with this type of device.

It should be noted that FIG. 4 is merely schematic, not necessarily to scale, and that the separator may (and in various embodiments does) include other components, devices and functional elements to those shown in FIG. 4.

Figure 4A:
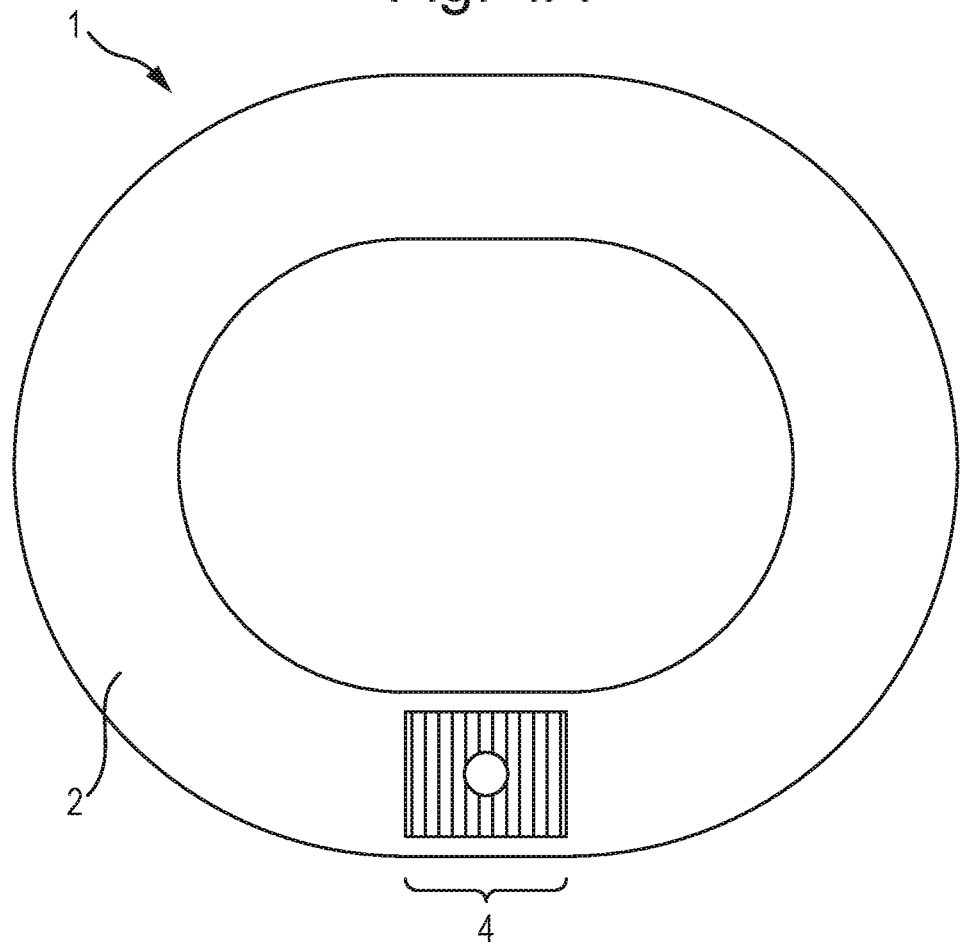
FIG. 4 illustrates a cyclic ion mobility separator.

FIG. 4A shows a front schematic view of an ion mobility separator (IMS) device according to embodiments. The IMS device 1 comprises a closed-loop drift cell 2 around which the ions are guided in use. The drift cell 2 comprises a closed-loop ion guide comprising a plurality of electrodes that act to confine the ions to an axial path that extends around the closed-loop drift cell 2. The ion guide also comprises electrodes that urge the ions along the axial length of the drift cell. The ion guide is filled with a background gas such that as the ions are urged around the drift cell 2 they collide with the gas molecules and separate according to their ion mobilities through the gas. The ions may be urged around the closed-loop drift cell 2 once or multiple times before being extracted through an exit region 4. The ions may be urged around the drift cell 2 by applying one or more electrical potentials that travels axially along the drift cell 2, or by a static DC potential gradient that is arranged axially along the drift cell 2.

Figure 4B:
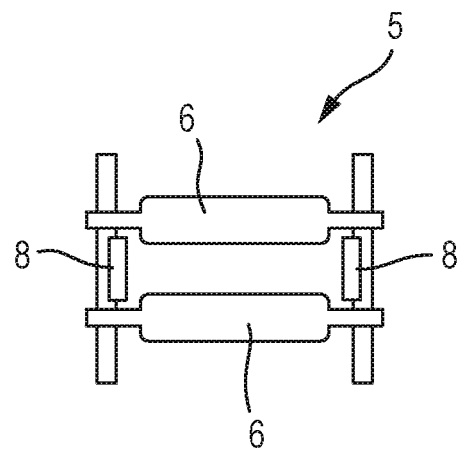

FIG. 4B shows a cross-sectional side view of a portion of the drift cell 2 of the IMS device of FIG. 4A. FIG. 4B shows an embodiment of an electrode unit arrangement 5 that may be used to confine ions to the axis of the ion guiding path in the drift cell 2. At a given point along the axial length of the ion guiding path, the path may be defined between two RF electrodes 6 that are spaced apart in a first direction and two DC electrodes 8 that are spaced in a second, optionally orthogonal, direction. RF voltages may be applied to the RF electrodes 6 so as to confine the ions between the RF electrodes 6, in the first direction. DC voltages may be applied to the DC electrodes 8 so as to confine the ions between the DC electrodes 8, in the second direction.

The electrode unit 5 may be repeated along the axial length of the drift cell 2 such that ions are confined in the drift cell 2 at all points around the ion guide, except when ions are ejected from the ion entry/exit region 4. The electrode units 5 may be axially spaced along the ion guiding path and one or more DC potentials may be successively applied to successive electrode units 5 such that a travelling DC potential travels around the drift cell 2 and hence forces the ions around the drift cell. Alternatively, different DC potentials may be applied to successive electrode units 5 around the ion guide such that a static DC gradient is applied along the axis that forces the ions around the drift cell 2.

The upper and lower sides of the drift cell 2 may be formed from printed circuit boards (PCBs) (comprising an insulating substrate) having the DC or RF electrodes 6,8 arranged thereon. Alternatively, or additionally, the radially inner and outer sides of the drift cell 2 may be formed from printed circuit boards (PCBs) (comprising an insulating substrate) having the RF or DC electrodes 6,8 arranged thereon.

Figure 4C:
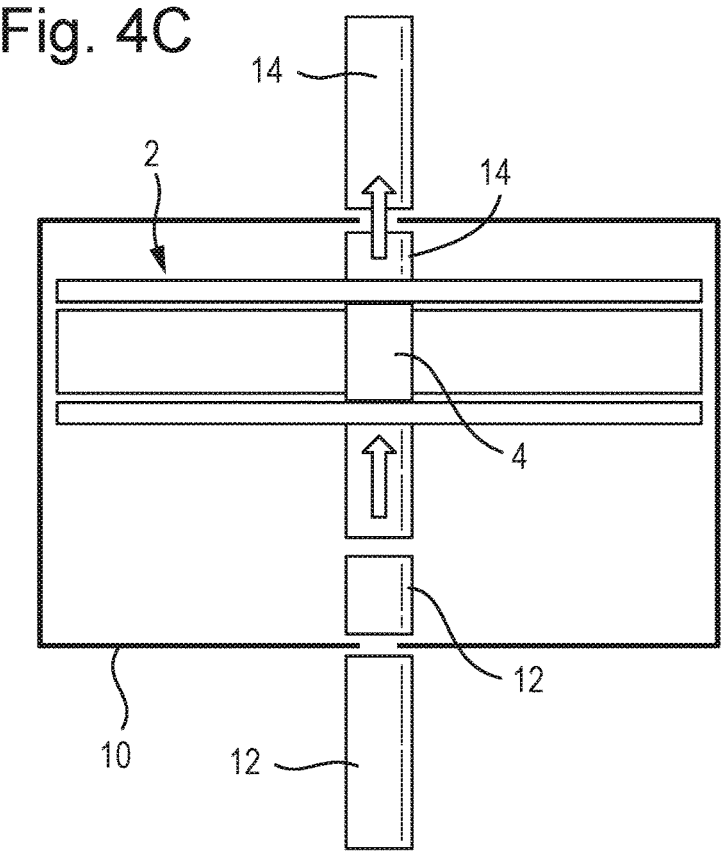
Figure 4D:
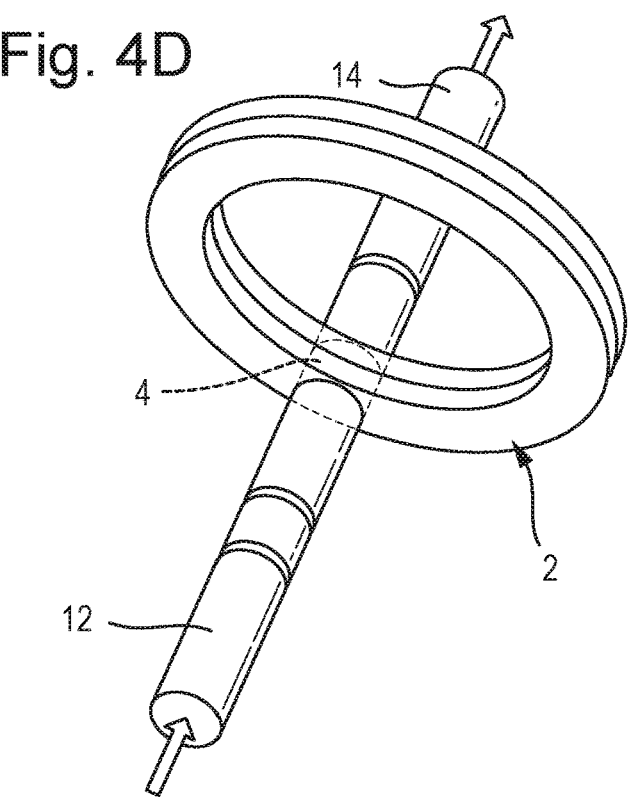

FIG. 4C and FIG. 4D show an orthogonal view and a perspective view of the embodiment of FIG. 4A respectively. The drift cell 2 may be arranged inside a chamber 10 that is filled with drift gas. Ions may be guided into and out of the chamber 10 using RF ion guides 12,14. The RF ion guides 12,14 may also be coupled with the ion entry/exit region 4 of the drift cell 2 such that ions can be guided into the drift cell 2 and out of the drift cell 2. In this embodiment, ions may be guided into the chamber 10 and into the entry/exit region 4 of the drift cell 2 by input ion guides 12. If the ions are desired to be separated by their ion mobility then the ions are urged in an orthogonal direction to the ion entry direction and are urged around the oval, circular or racetrack ion path of the drift cell 2 for example when the ion entry/exit device 4, and hence the ion mobility separation device comprising the ion entry/exit device 4 is operated in an ion separation mode. As the ions pass along the ion path they separate according to their ion mobility through the drift gas that is present in the chamber 10 and hence the drift cell 2. When ions are desired to be extracted from the drift cell 2 for example when the ion entry/exit device 4 and hence the ion mobility separation device, is operated in an eject for detection mode, they are ejected in a direction towards the exit RF ion guides 14. The ions may then be guided out of the chamber 10 by the exit ion guides 14.

On the other hand, if ion mobility separation of the ions is not required then ion species can be caused to pass from the input ion guide 12 to the output ion guide 14 directly through the entry/exit region 4 of the drift cell 2 and without passing around the drift cell 2. In other words, the ion entry/exit device 4, and hence the ion mobility separation device, may be operated in a by-pass mode.

In embodiments, it is possible to extract ions having a desired range of ions mobilities from the drift cell 2. This is achieved by causing ions to traverse around the drift cell 2 so that they separate and then synchronising the activation of one or more ejection voltages at the ion entry/exit region 4 with the time at which the ions of interest are at the entry/exit region 4. This may be achieved by timing a transition between separation and eject modes appropriately. The desired ions are therefore ejected from the drift cell 2 and the other ion species remaining in the drift cell 2 can continue to pass through the drift cell 2 and separate according to ion mobility. Alternatively, the remaining ions may be discarded from the drift cell 2, for example, by removal of the RF voltages from the electrodes 6 such that the ions are no longer confined within the drift cell 2.

The ejected ions having the desired ion mobilities can be immediately transported away from the drift cell 2 to a detector, optionally first passing through a mass analyser. This may occur if an eject for detection mode is specified. Alternatively, if an eject for storage mode is specified, such ions may be trapped in an ion store whilst the next mobility cycle occurs in the drift cell 2 and until more ions of the same ion mobility range are ejected from the drift cell 2 into the ion store.

It will be appreciated that, although not shown in FIG. 4, the IMS device may be coupled to a mass analyser for performing mass spectrometry on ions leaving the device. Such arrangements are shown, for example, in US 2017/0076926 (Micromass), the entire contents of which is incorporated herein by reference. For example, ions may be passed via a transfer cell to a mass analyser of a mass spectrometer, such as a Time of Flight mass analyser.

A cyclic IMS device as described above with reference to FIG. 4, was constructed using FR-4 as a PCB insulating substrate. Adducting was observed during experiments with high molecular weight (Mw) proteins in the cyclic IMS device. Mass spectra were obtained by passing ions through the cyclic IMS device, and then mass analysing the ions.

Figure 5A:
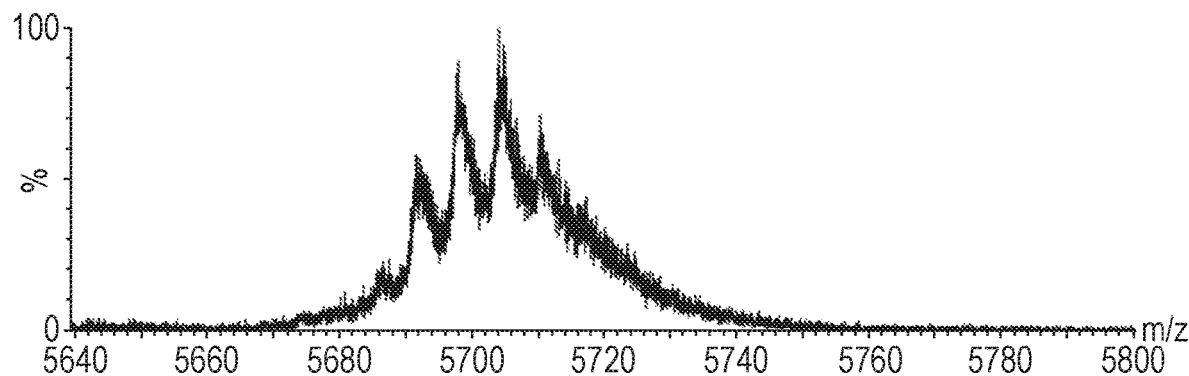
FIG. 5 shows mass spectra illustrating contamination of a cyclic ion mobility separator constructed using FR-4.

FIG. 5 shows example mass spectral data obtained from an analysis of monoclonal antibody (mAb), which has a molecular weight (Mw) of about 150 kDa. FIG. 5A shows the mAb mass spectrum obtained in "bypass mode". In this mode, as discussed above, ions do not travel around the cyclic IMS device, and thus the residency time in the device is relatively short. The peaks shown in FIG. 5A correspond to different charge states of mAb, which were as expected.

Figure 5B:
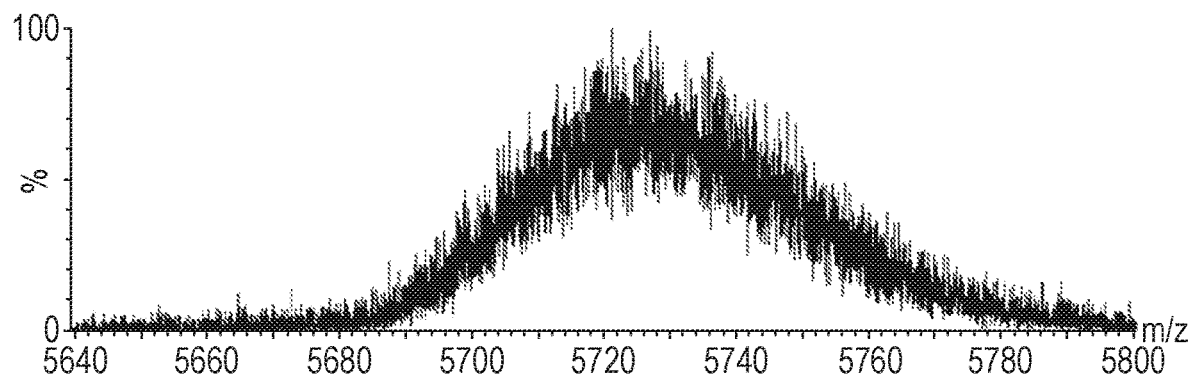

FIG. 5B shows the mass spectrum when ions completed one pass around the cyclic IMS device. Here, residency time within the cyclic IMS device housing is increased by a factor of about 10, as compared to "bypass mode". As shown in FIG. 5B, the charge state peaks are no longer resolved in the mass spectrum. This is indicative of relatively low molecular weight (Mw) molecules adducting onto the precursor mAb ions, and thereby causing a shift in mass to charge ratio (m/z).

The level of adduction was observed to increase with the number of passes that ions made around the cyclic IMS device. That is, adduction was observed to increase with increasing residency time within the cyclic IMS device.

Figure 5C:
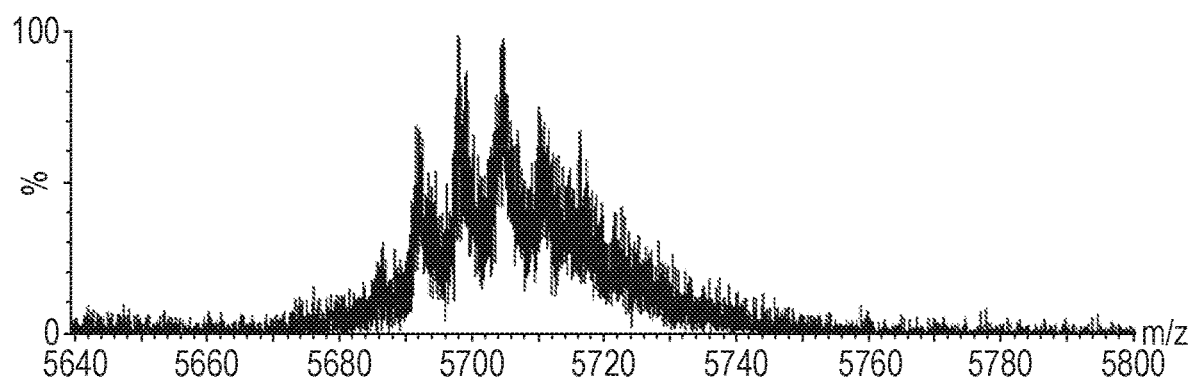

FIG. 5C shows the mass spectrum when ions completed one pass around the cyclic ion mobility device, and then the ions were activated by being accelerated into a collision cell, before the ions were mass analysed. Here, increasing the energy of adducted ions resulted in loss of adducts, and thus the mass spectrum of FIG. 5C resembles that of FIG. 5A. This confirms that the shift in m/z shown in FIG. 5B is caused by molecules adducting onto precursor ions.

This adducting effect in the cyclic IMS was observed for all of the high molecular weight (Mw) proteins that were investigated (including streptavidin, alcohol dehydrogenase, concanavalin A, and glutamate dehydrogenase). Adduct ions were observed, in particular, having a range of masses in a region of about 300 to 400 Da. It was determined that molecules outgassing from the FR-4 material may be present in the IMS buffer gas, and may be adducting onto the analyte ions.

Adducting was also observed for the low molecular weight (Mw) compound Ferroin, which has a molecular weight (Mw) of 596 Da. Ferroin is a transition metal coordination complex consisting of an iron (Fe) metal centre surrounded by three phenanthroline ligands ($[Fe\ Phe_3]^{2+}$). When exposed to adduct molecules a reaction may occur, where phenanthroline ligands are exchanged forming a new complex with a different mass to charge ratio (m/z).

Ferroin precursor ions having mass to charge ratio m/z=298, and a charge state 2+ were trapped inside the cyclic IMS device housing for varying amounts of time, before being mass analysed.

FIG. 6A shows a mass spectrum resulting from Ferroin ions being analysed in "bypass mode", and FIG. 6B shows a mass spectrum resulting from Ferroin ions being trapped in the cyclic IMS device for 400 ms. As can be seen in FIG. 6B, when Ferroin ions were trapped within the cyclic IMS device for 400 ms, a significant ion peak at a mass to charge ratio (m/z) of 396.5 appeared, as compared to "bypass mode". This peak was determined to correspond to a Ferroin precursor ion which has lost two Phe ligands and gained a new ligand with a mass of 162.2 Da. It was found that this corresponds to Diethylene Glycol Butyl Ether (DGBE) ($C_8H_{18}O_3$). Thus, it was determined that the new peak at m/z 396.5 corresponds to the adduct [Fe Phe DGBE]$^+$.

DGBE is a solvent used in a "desmear" process during FR-4 PCB manufacturing, which is necessary for the production of multi-layered PCBs. Various steps were taken to reduce the amount of DGBE present in the FR-4 material. However, adducting of a similar magnitude to that described above was still observed. It was determined that FR-4 may not be suitable for long-term operation of a cyclic IMS device.

Several alternative PCB insulating substrate materials were therefore investigated, including CuClad® 250, Rogers 4003, Rogers 6002, Rogers 6202, Rogers Kappa, Technolam 150HF and Isola Terragreen™. PCB samples were cut into approximately 5 mm squares and immersed in hexane for 24 hours. Hexane extracts were then analysed using gas chromatography-mass spectrometry (GCMS).

The results of this analysis were compared with a GCMS analysis of a "blank" hexane sample without PCB immersion. It was found that the PCB materials that were tested exhibited various amounts of volatile extractables. However, one material in particular, CuClad®250, was found to exhibit no significant volatile content. CuClad® 250 was also found, in contrast with the other materials tested, to generate no detectable odour when cut. CuClad® 250 is a cross-plied woven fiberglass/PTFE-based insulating substrate.

A cyclic IMS device was constructed using CuClad® 250 as the insulating substrate material. To further reduce the potential for contamination, each PCB was constructed using only a single layer of CuClad®. Furthermore, no solder resist was used. Data obtained using the CuClad® assembly was compared with that obtained with the "standard" FR-4 assembly described above.

Figure 7A:
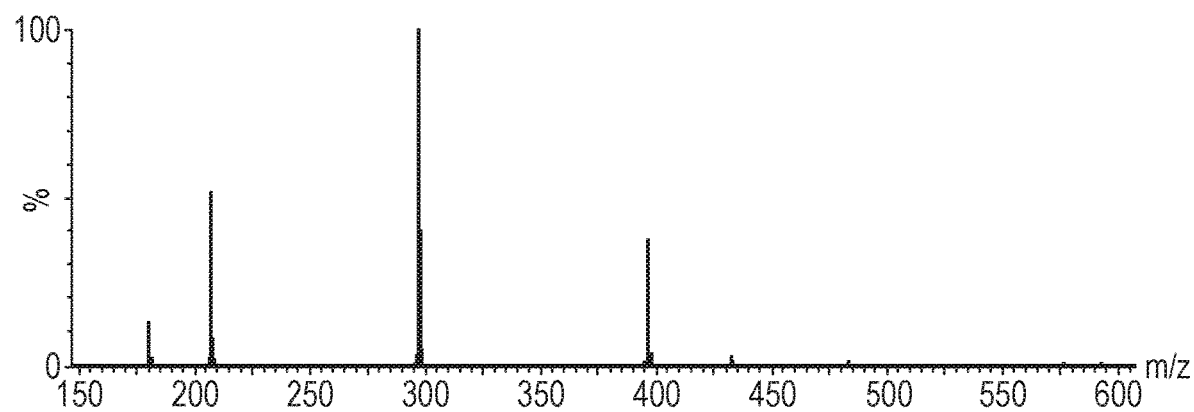
FIG. 7 shows a comparison of mass spectra obtained using cyclic ion mobility separators constructed using FR-4 and CuClad®.
Figure 7B:
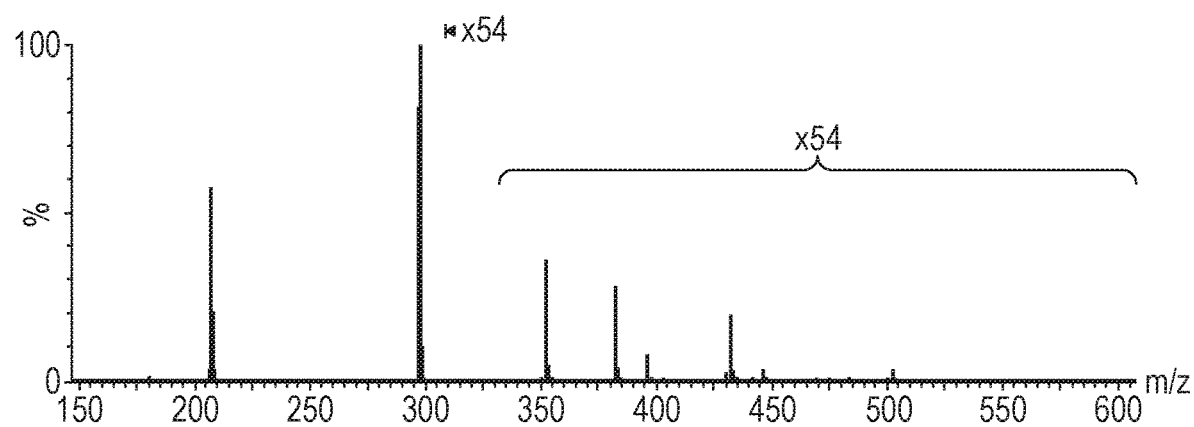

FIG. 7A shows a mass spectrum for Ferroin ions that have been trapped for 400 ms within the FR-4 device, and FIG. 7B shows the corresponding mass spectrum for Ferroin ions that have been trapped in the CuClad® device for 400 ms. Although different adducts can be observed in the CuClad® data of FIG. 7B as compared to the FR-4 data of FIG. 7A, an overall improvement of a factor of about 54 in the total amount of adducts can be observed. That is, FIG. 7 shows that the overall amount of contamination by adducts was significantly reduced in the cyclic IMS device constructed using CuClad® as compared to the cyclic IMS device constructed using FR-4.

Figure 8A:
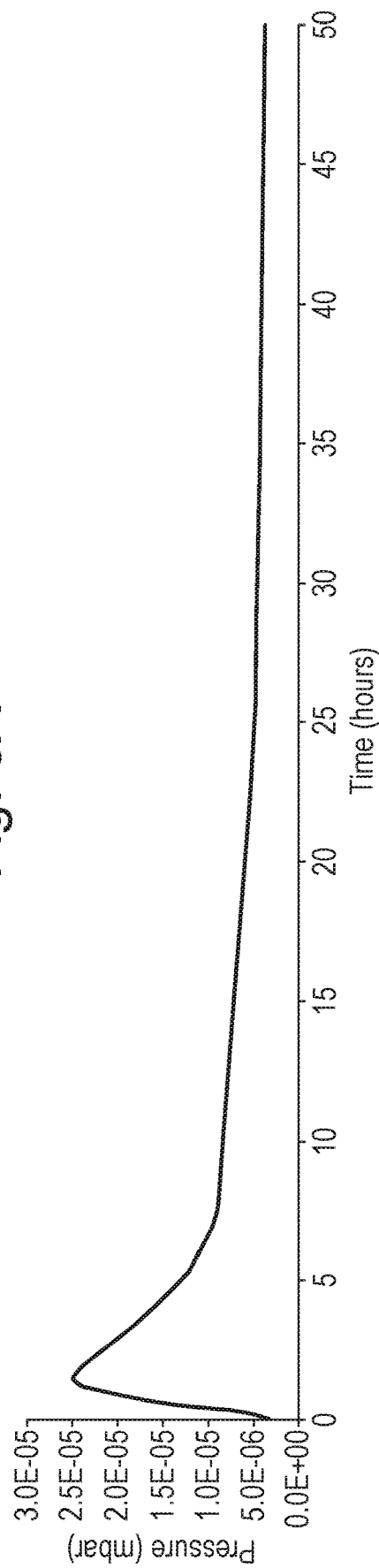
FIG. 8 shows outgassing data obtained when vacuum baking a cyclic ion mobility separator constructed using CuClad®.
Figure 8B:
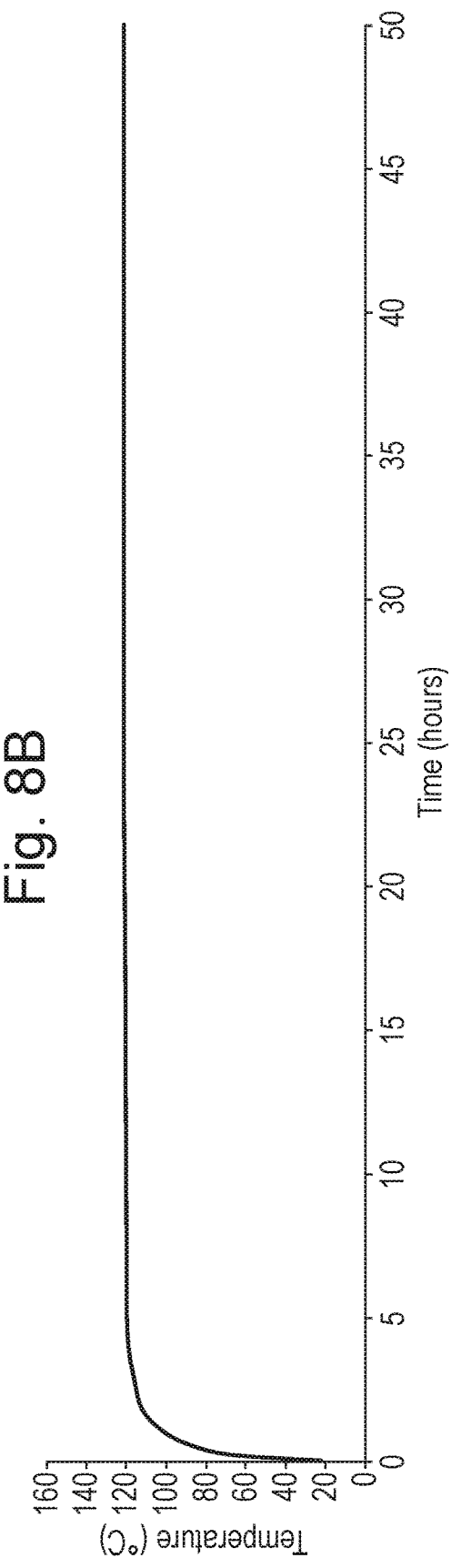

Vacuum baking of the components of the CuClad® based cyclic IMS device was also investigated to further reduce the amount of volatile components. FIG. 8 shows outgassing data for the cyclic IMS device constructed from CuClad™ material. As can be seen in FIG. 8, upon heating to 120° C. pressure increases, suggesting "boiling off" of some of the components of the CuClad™ material. After about 50 hours at 120° C., pressure returns to the original value, indicating that the majority of the volatile content has been removed.

Figure 9A:
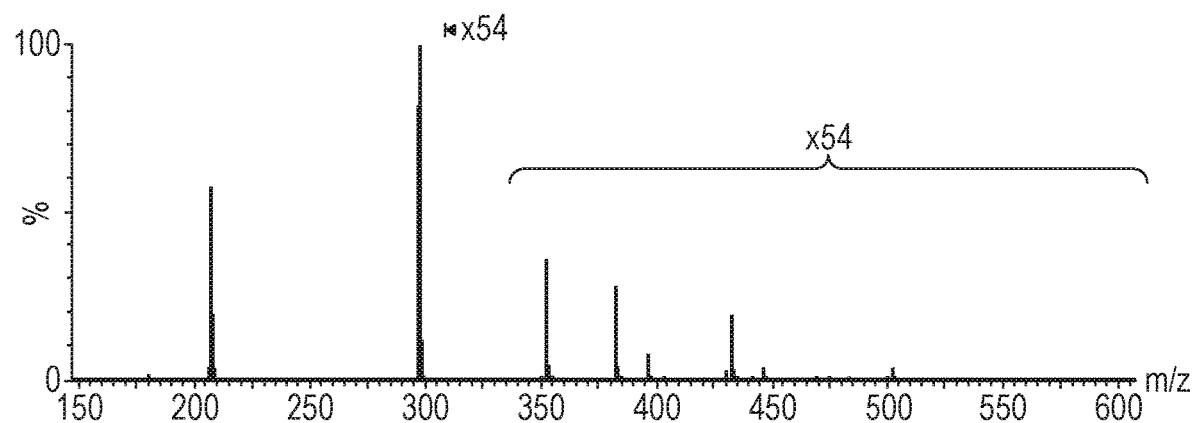
FIG. 9 shows a comparison of mass spectra obtained using a cyclic ion mobility separator constructed using CuClad® before and after vacuum baking.
Figure 9B:
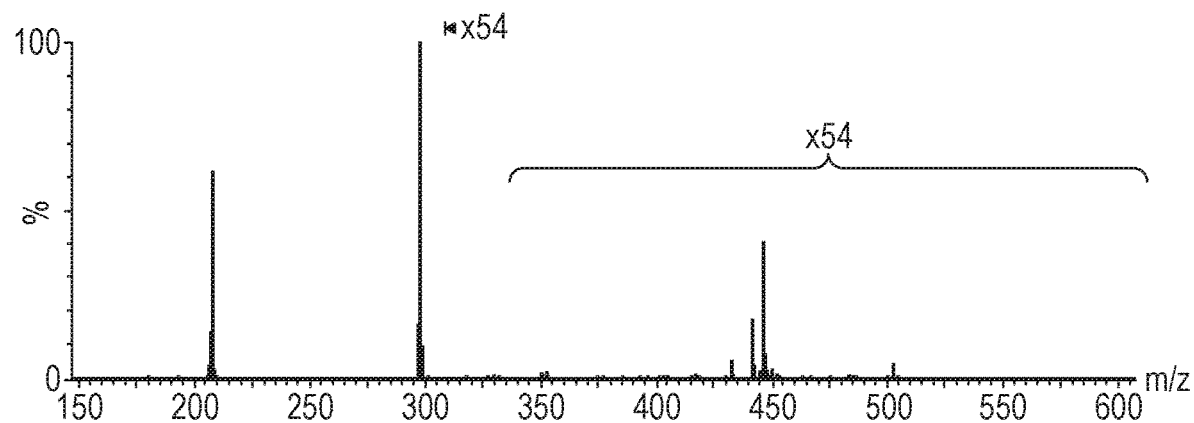

FIG. 9 shows a comparison of results of the "Ferroin" tests before (FIG. 9A) and after (FIG. 9B) the CuClad® device was vacuum baked at 120° C. for 50 hours. As can be seen in FIG. 9, following the vacuum baking, adduct signals at mass to charge ratios of 352.5, 382.5 and 396.5, which were present before baking, are no longer present. A signal from a new adduct is, however, observed at a mass to charge ratio of 446.5. This is assumed to be a product of thermal decomposition of some of the chemicals present in CuClad® material. However, an overall improvement in the amount of contamination by adducts can be observed.

Figure 10A:
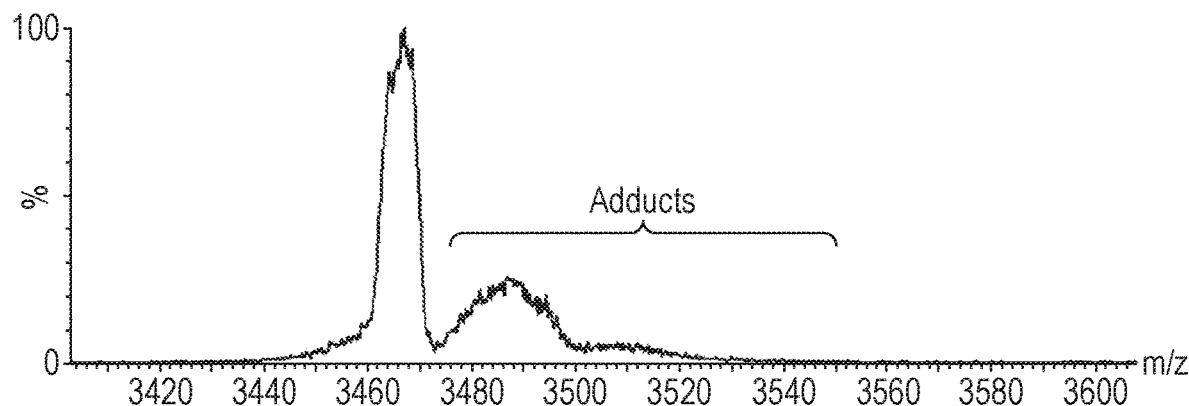
FIG. 10 shows a comparison of mass spectra obtained using cyclic ion mobility separators constructed using FR-4 and CuClad®.

FIG. 10 shows a comparison of mass spectral data for streptavidin protein ions (52 KDa, +15) analysed in a similar manner discussed above. Thus, FIG. 10A shows a mass spectrum resulting from streptavidin ions being trapped within the cyclic IMS device constructed from FR-4 for 400 ms. The FR-4 device was cleaned with high purity methanol (LCMS grade) immediately prior to performing the analysis, however FIG. 10A clearly shows adducting occurring in a mass to charge ratio range of between about 3480 and 3560.

Figure 10B:
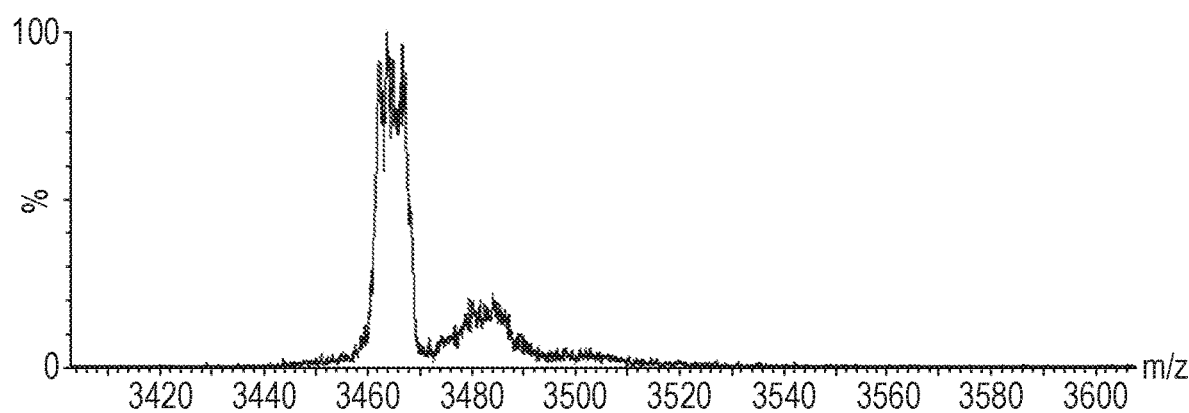

FIG. 10B shows the corresponding results for streptavidin ions being trapped within the cyclic IMS device constructed from CuClad® for 400 ms. As can be seen in FIG. 10B, the amount of adducts detected in the CuClad® device is reduced by a factor of about 2, as compared to the FR-4 device.

Figure 10C:
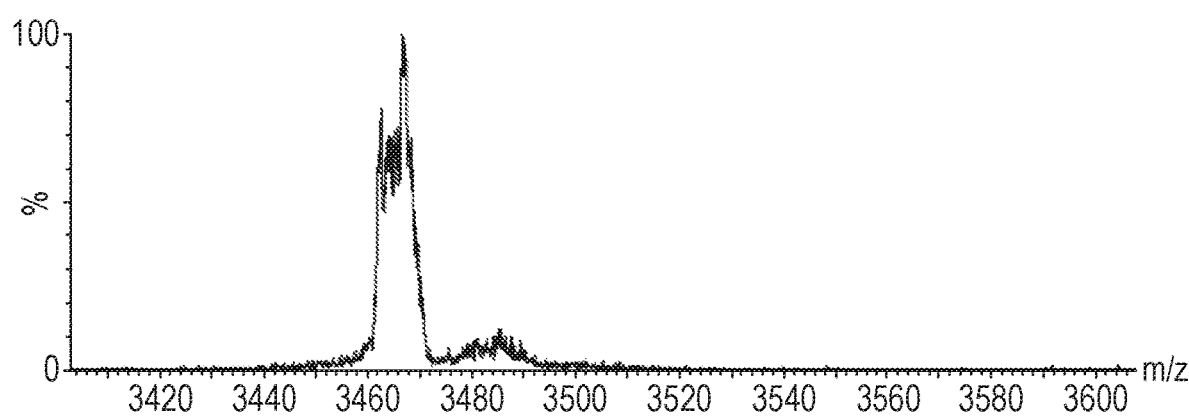

FIG. 10C shows the corresponding results for streptavidin ions being trapped for 400 ms within the cyclic IMS device constructed from CuClad® which has undergone vacuum baking at 120° C. for 50 hours. As can be seen in FIG. 10C, a further reduction in the adducting effect can be observed, as compared to the unbaked CuClad® device.

FIG. 11 shows a comparison of mass spectral data for Bovine Serum Albumin (BSA) ions analysed in a similar manner discussed above. BSA was infused using an electrospray ionisation (ESI) source. A quadrupole mass filter was set to select ions corresponding to the +17 charge state, with a ~3 m/z wide mass window. Mass selected ions were then passed into the FR-4 and CuClad cyclic IMS devices operating in a "bypass" mode and operating to trap ions for 400 ms.

Figure 11A:
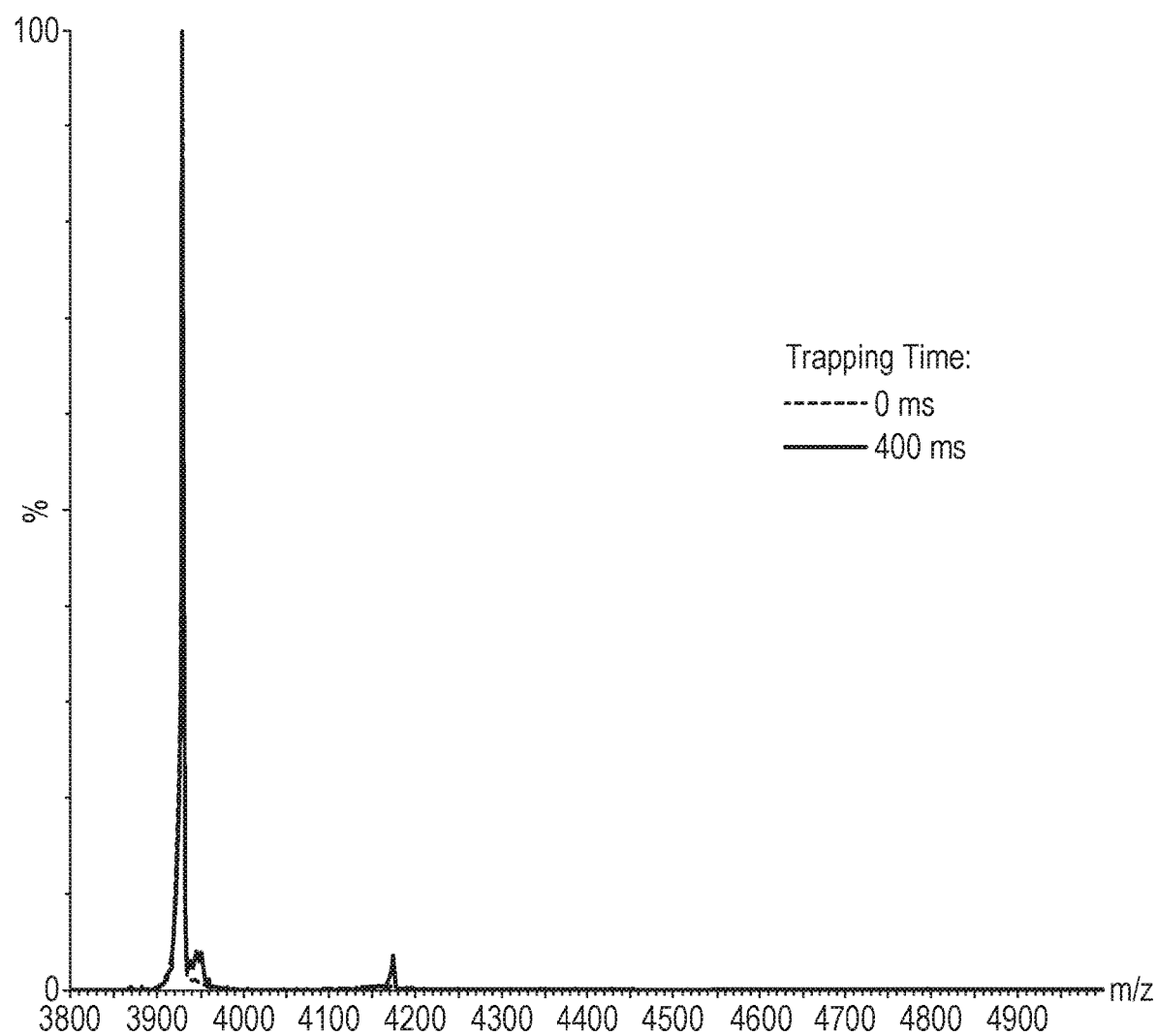
FIG. 11 shows a comparison of mass spectra obtained using cyclic ion mobility separators constructed using FR-4 and CuClad®.

FIG. 11A shows the results for the cyclic IMS device constructed using FR-4. Solder resist was not applied to the FR-4 device. However, significant adducting effects can be observed when the ions were trapped in the device for 400 ms. Adducting can also be seen even when the device is operating in "bypass" mode.

Figure 11B:
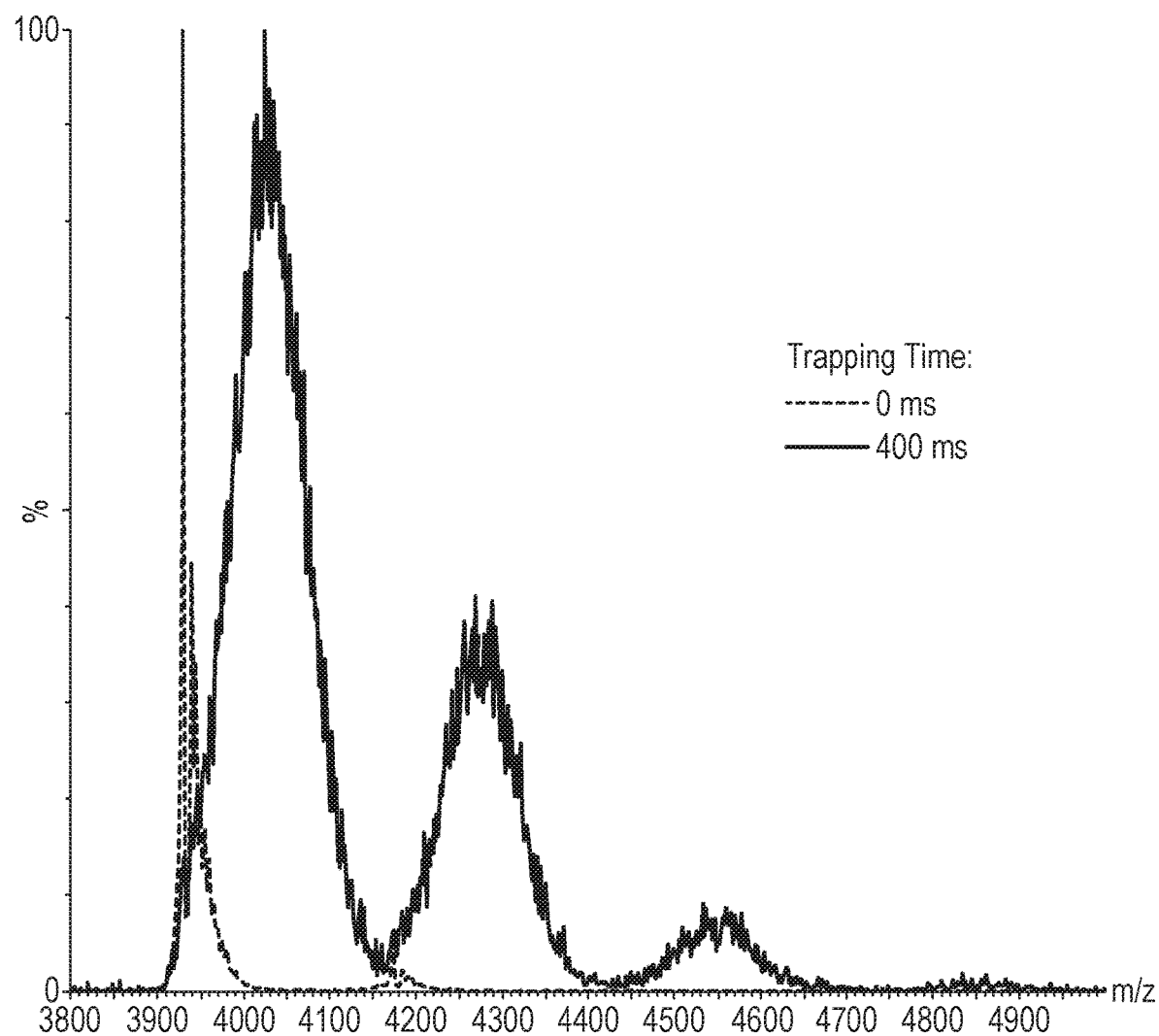

FIG. 11B shows the corresponding results for the baked CuClad® cyclic IMS device. A significant reduction in adductation can be observed, as compared to the FR-4 device, both when ions were trapped in the device for 400 ms, and when the device was operated in "bypass" mode.

Cleaning the CuClad® device in high purity methanol (LCMS grade) was found to further reduce adductation.

Thus, various embodiments are directed to the use of a PTFE-based insulating substrate to form an ion guide or trap for an analytical instrument.

The insulating substrate may comprise woven fiberglass. Thus, the insulating substrate may be a woven fiberglass/PTFE composite material.

The insulating substrate may comprise cross-plied woven fiberglass. That is, alternate layers of fiberglass plies may be oriented approximately at 90° to each other. Particular examples of a cross-plied woven fiberglass/PTFE-based material include the CuClad® series of insulating substrates.

The insulating substrate may comprise a ratio of fiberglass to PTFE (by weight and/or by volume) selected from the group consisting of: (i) ≥0.1; (ii) ≥0.2; (iii) ≥0.3; (iv) ≥0.4; (v) ≥0.5; (vi) ≥0.6; (vii) ≥0.7; (viii) ≥0.8; (ix) ≥0.9; (x)≥1; (xi)≥1.1; (xii) ≥1.3; and (xiii) ≥1.5. The insulating substrate may comprise from 1 part fiberglass to 1 part PTFE (1:1) to 1 part fiberglass to 2 parts PTFE (1:2).

The insulating substrate may have a dialectic constant selected from the group consisting of: (i) <2; (ii) ≥2; (iii) ≥2.1; (iv) ≥2.2; (v) ≥2.3; (vi) ≥2.4; (vii)≥2.5; and (viii) ≥2.6. The insulating substrate may have a dialectic constant of between 2.4 and 2.6, such as approximately 2.5. A particular example of such a material is CuClad® 250. The dielectric constant may be measured at 10 GHz or 1 MHz using the IPC TM-650 2.5.5.3 (C23/50) test method.

The insulating substrate may have a total mass loss of ≥0.01%. The insulating substrate may have a collected volatile condensable material of ≥0.01% or <0.01%. The insulating substrate may have a water vapour regain of <0.01%. These outgassing parameters may be measured using the NASA SP-R-0022A test method (125° C., ≤$10^{-6}$ torr).

The electrodes may each be attached to an insulating substrate that consists of only a single (contiguous) layer of insulating substrate material. This reduces the amount of insulating substrate present within the vacuum chamber.

Furthermore, the inventors have found that processes for manufacturing multi-layered boards, which may include a "desmear" and/or "pattern plate" process, can increase the likelihood of contaminants. For example, a "desmear" process can increase the likelihood of contaminants, such as Diethylene Glycol Butyl Ether (DGBE). Moreover, contaminants may be trapped between the layers of multi-layered boards. Thus, the ion guide and/or ion trap may be formed without subjecting the insulating substrate to a "desmear" and/or "pattern plate" process. The insulating substrate may be fusion bonded (with no adhesives).

As discussed above, the inventors have furthermore found that large ion guides, such as those used in cyclic ion mobility separation devices, may be particularly susceptible to electrical breakdown.

Analytical instrument ion guides and/or ion traps, such as those used in mass spectrometers and ion mobility spectrometers, are often operated by applying relatively high voltages to electrodes of the ion guide and/or ion trap which are positioned within a relatively low pressure gas. This can lead to gas discharge occurring between electrodes, depending on factors including gas pressure, gas composition, applied voltages, distance between electrodes and electrode shape. Electrode shape can be affected by factors including manufacturing precision, and electrode surface smoothness, for example.

This means that the conditions at which gas discharge is likely to occur may be difficult to predict, especially when, for example, complex electrode assemblies are used, and/or gas pressure and composition are varied, and/or time-variable voltages are used.

Gas discharge can cause damage to ion guide and/or ion trap electrodes and to other electronic components. Moreover, gas discharge can cause the production of products that can undesirably react with analyte ions, and/or deposit onto various surfaces of ion optics, components and the housing of the instrument. Such deposited material can cause malfunctioning of the analytical instrument. For example, the products can alter the electric fields in the instrument, and thus interfere with the movement of analyte ions. Similarly, plasma resulting from gas discharge can undesirably affect electrical fields.

It is therefore desired to reduce or avoid electrical discharge inside analytical instruments.

FIG. 12 illustrates an ion guide according to an embodiment. The ion guide in this embodiment is the cyclic ion guide shown in FIG. 3. However, other arrangements, such as a linear ion guide, are possible.

Figure 12A:
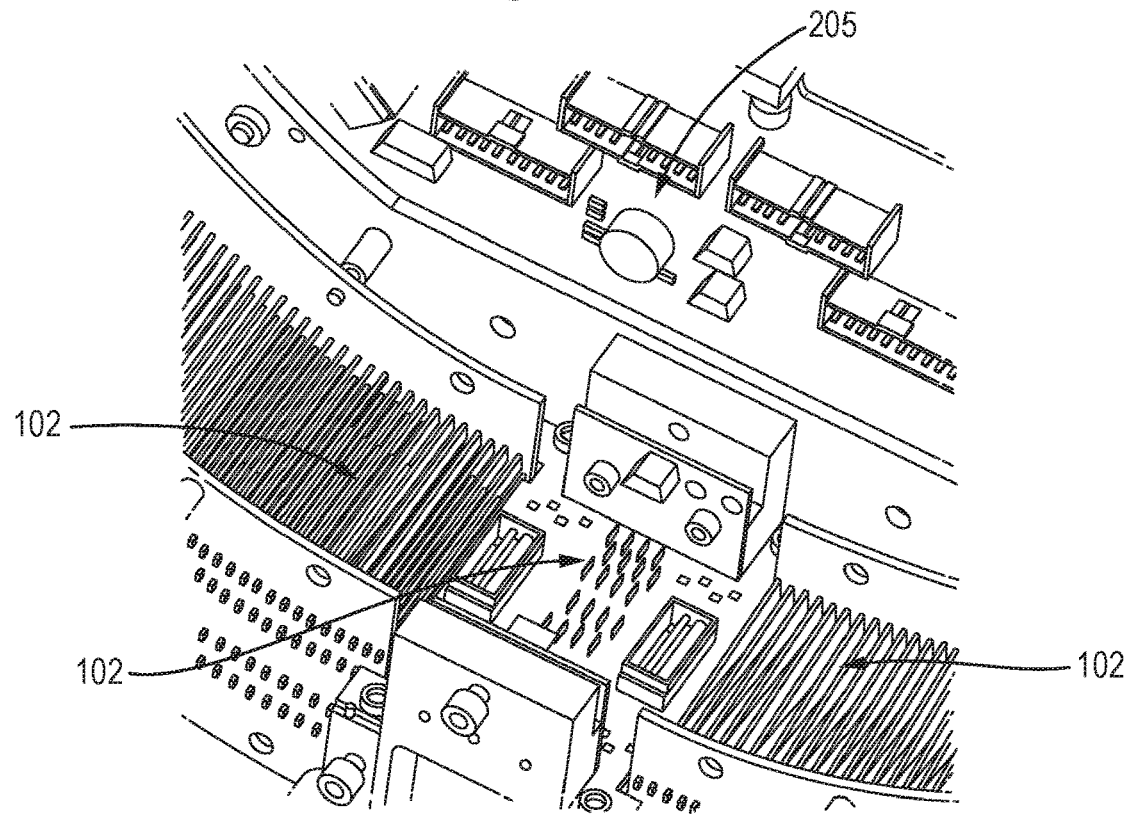
FIG. 12 illustrates an ion guide comprising a photodiode.

As shown in FIG. 12A, the ion guide comprises a plurality of electrodes 102, and a photodiode 205 that is configured to detect light emitted from the ion guide as a result of electrical breakdown (gas discharge) between the electrodes.

The photodiode 205 can be positioned in any suitable position with respect to the ion guide, so long as emitted photons can be detected. For example, the photodiode 205 can be mounted inside the vacuum chamber housing the ion guide, inside the feedthrough, or outside of the chamber, in which case the chamber may comprise a transparent window arranged such that photons emitted from the ion guide can reach the photodiode 205.

In the present embodiment, the photodiode 205 is positioned inside the vacuum housing of the ion guide, in close proximity to a region of the ion guide where electrodes are in close proximity to each other. The inventors have recognised that electrical breakdown may be more likely to occur in regions of an ion guide having electrodes that are closer to each other, and thus, by positioning the photodiode 205 in close proximity to such a region, the detection of breakdown can be improved.

Figure 12B:
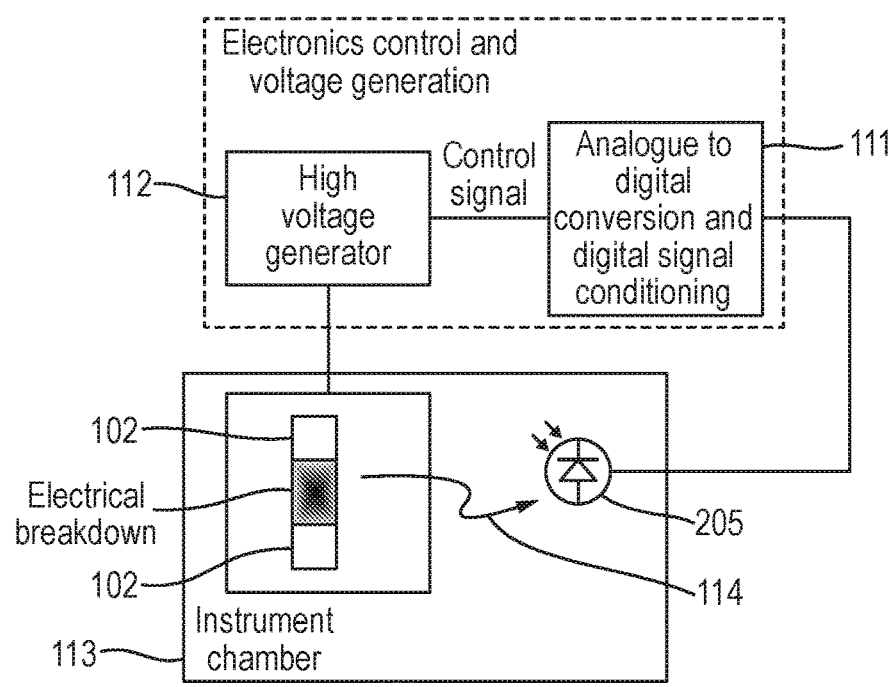

FIG. 12B shows a functional diagram of a control loop arrangement comprising the photodiode 205 and associated control circuits, according to the present embodiment.

As shown in FIG. 12B, a voltage source 112 is configured to apply voltages to the electrodes 102 of the ion guide so that ions can be confined within the ion guide. The voltage source 112 may apply any suitable voltage to the electrodes 102, such as DC and/or AC/RF voltages (as described above).

The electrodes 102 of the ion guide are arranged within a chamber 113. The chamber 113 may be maintained at a relatively low pressure, or it could be filled with a relatively higher pressure gas. For example, the chamber 113 may be a collision cell or ion mobility separation region.

When electrical breakdown occurs between electrodes 102 or other electrical components of the ion guide, light 114 may be produced, and detected by the photodiode 205. In other embodiments, a detector that can detect other emissions caused by electrical breakdown (gas discharge), such as electrons and/or ions, may be used. For example, a Faraday cup or electron multiplier may be used.

The detector (photodiode 205) should be (and in various embodiments is) located outside of the electrodes of the ion guide (and/or trap), that is outside of an ion guiding region of the ion guide or outside a trapping region of the trap. This will ensure that only light or particles produced due to electrical breakdown between the electrodes of the ion guide or trap will be detected by the detector (and analyte ions will not be detected by the detector).

As shown in FIG. 12B, the output signal from the photodiode 205 is passed to a control circuit 111. The control circuit 111 may convert an analogue signal output by the photodiode 205 into a digital signal, and then process the digital signal to determine whether the signal indicates that electrical breakdown has occurred. The control circuit 111 may digitally condition and process the signal such that electrical discharges can be differentiated from normal operation. Thus, for example, background signals, for example caused by cross-talk due to voltage pulses applied to the electrodes, may be removed.

In response to the detection of electrical discharge, the control circuit 111 may then control the voltage supply 112. This may involve adjusting the voltages applied to the electrodes 102 until discharge is no longer detected. Thus, for example, the voltage applied to the electrodes may be reduced until discharge is no longer detected. Additionally or alternatively, a voltage supplied to the electrodes may be removed or turned off. In other embodiments, operational parameters other than voltage can be adjusted, such as gas pressure and/or gas composition. Thus, a control loop may be formed using the photodiode 205 as the detection device. In this way, further electrical breakdown can be reduced or avoided.

Electrical detection events may furthermore be communicated to the instrument operator, for example via control software and recorded.

In further embodiments, the photodiode 205 is configured to detect photons emitted from the ion guide which have a particular energy or range of energies. The control circuit 111 may then control the voltage supply 112 in response to photons of the particular energy or range of energies being detected.

This may be achieved, for example, by selecting the photodiode 205 to be sensitive to a particular colour of light, and/or using an appropriate filter. Alternatively, the photodiode 205 may be sensitive to a wider range of colours, and the control circuit 111 may determine a signal corresponding to the particular energy or range of energies of interest.

The inventors have realised that during gas discharge, photons may be emitted at energies specific to the type of gas molecules involved. This means that it is possible to tailor the ion guide control to the particular ion guide parameters being used. This can further increase the accuracy of breakdown detection, for example.

Moreover, photons having a particular energy or ranges of energies may be emitted at certain phases of the electric discharge. This means that it is possible to tailor the ion guide control to photons emitted very early in the phase of the electrical discharge, for example. For example, photons may be detected on time scales between nano and milliseconds. Accordingly, very fast response times can be obtained. Thus electrical discharges can be detected and stopped on short time scales, thereby preventing damage.

Although the above embodiments have been described with particular reference to reducing, removing or turn off one or more voltages in response to a detector detecting light due to electrical breakdown, the voltage(s) may also be reduced, removed or turned off when the detector detects light from elsewhere. For example, when light is introduced into the housing in which the electrodes are arranged, for example due to a user or service engineer opening the housing, the voltage(s) may be reduced, removed or turned off. This will ensure that the user or service engineer is not exposed to potentially hazardous voltages.

Thus, the photodiode may be configured to protect the instrument from damage due to electrical breakdown, but also to protect a user or service engineer from potentially hazardous voltage(s). As such, the protection mechanism may be extended to the removal of potentially hazardous voltage(s) in the event that a user or service engineer lets light into what is otherwise a sealed, dark, enclosure, for example during maintenance.

Although the above embodiments have been described with particular reference to a cyclic IMS device, it will be appreciated that in various other embodiments, an ion guide according to the various embodiments described herein is used in other instruments.

Although the above has been described with particular reference to a cyclic ion guide, it will be appreciated that in various other embodiments, an ion guide according to the various embodiments described herein has a different geometry. For example, in various embodiments, the ion guide is substantially linear.

Although the above embodiments have been described with particular reference to an ion guide, it will be appreciated that in various other embodiments, an ion trap may be formed and operated according to the various embodiments described herein.

Although the present invention has been described with reference to preferred embodiments, it will be understood by those skilled in the art that various changes in form and detail may be made without departing from the scope of the invention as set forth in the accompanying claims.

The invention claimed is:

1. An ion guide and/or trap comprising:
    a plurality of electrodes;
    a detector configured to detect light or particles emitted from the ion guide and/or ion trap due to electrical breakdown; and
    a control circuit configured to control the ion guide and/or ion trap in response to the detector detecting light or particles emitted from the ion guide and/or ion trap.

2. The ion guide and/or trap of claim 1, comprising one or more voltage sources configured to apply one or more voltages to the plurality of electrodes;
    wherein the control circuit is configured to control the ion guide and/or ion trap by controlling the one or more voltages applied to the plurality of electrodes.

3. An ion guide and/or trap comprising:
    a plurality of electrodes;
    one or more voltage sources configured to apply one or more voltages to the plurality of electrodes;
    a detector configured to detect light in the vicinity of the electrodes; and
    a control circuit configured to reduce, remove or turn off one or more of the one or more voltages in response to the detector detecting light in the vicinity of the electrodes.

4. The ion guide and/or trap of claim 2, wherein the one or more voltage sources comprise an RF voltage source configured to apply an RF voltage to the electrodes; and
    wherein the control circuit is configured to reduce, remove or turn off the RF voltage in response to the detector detecting light or particles.

5. The ion guide and/or trap of claim 1, wherein the detector comprises a photodiode.

6. The ion guide and/or trap of claim 1, wherein the plurality of electrodes are arranged within a housing, and wherein an inner surface of the housing is reflective.

7. The ion guide and/or trap of claim 1, wherein the plurality of electrodes are arranged to form an ion guiding path having a length selected from the group consisting of: (i) $\geq 5$ cm; (ii) $\geq 10$ cm; (iii) $\geq 20$ cm; (iv) $\geq 30$ cm; (v) $\geq 40$ cm; and (vi) $\geq 50$ cm.

8. The ion guide and/or trap of claim 1, wherein the ion guide and/or ion trap is configured such that ions have a residence time within the ion guide and/or ion trap selected from the group consisting of: (i) $\geq 50$ ms; (ii) $\geq 100$ ms; (iii) $\geq 200$ ms; (iv) $\geq 300$ ms; and (v) $\geq 400$ ms.

9. The ion guide and/or trap of claim 1, wherein the plurality of electrodes are arranged to form a closed-loop ion guiding path.

10. An ion mobility separator comprising the ion guide and/or trap of claim 1.

11. An analytical instrument comprising the ion guide and/or trap of claim 1.

12. A method of operating an ion guide and/or trap comprising a plurality of electrodes, the method comprising:
    detecting light or particles emitted from the ion guide and/or ion trap due to electrical breakdown; and controlling the ion guide and/or trap in response to detecting light or particles emitted from the ion guide due and/or ion trap to electrical breakdown.

13. The method of claim 12, comprising applying one or more voltages to the plurality of electrodes, and controlling the ion guide and/or trap by controlling the one or more voltages applied to the plurality of electrodes.

14. The method of claim 12, comprising applying an RF voltage to the electrodes; and
reducing, removing or turning off the RF voltage in response to detecting light or particles emitted from the ion guide and/or ion trap.

15. The method of claim 12, wherein the detector comprises a photodiode, and the method comprises detecting light emitted from the ion guide and/or trap using the photodiode.

16. The method of claim 12, wherein the plurality of electrodes are arranged within a housing, and wherein an inner surface of the housing is reflective.

17. The method of claim 12, wherein the plurality of electrodes are arranged to form an ion guiding path having a length selected from the group consisting of: (i) ≥5 cm; (ii) ≥10 cm; (iii) ≥20 cm; (iv) ≥30 cm; (v) ≥40 cm; and (vi) ≥50 cm.

18. The method of claim 12, further comprising operating the ion guide and/or ion trap such that ions have a residence time within the ion guide and/or ion trap selected from the group consisting of: (i) ≥50 ms; (ii) ≥100 ms; (iii) ≥200 ms; (iv) ≥300 ms; and (v) ≥400 ms.

19. The method of claim 12, wherein the plurality of electrodes are arranged to form a closed-loop ion guiding path.

20. A method of mass and/or ion mobility spectrometry comprising the method of claim 12.

* * * * *